US011410156B2

(12) United States Patent
Ding et al.

(10) Patent No.: US 11,410,156 B2
(45) Date of Patent: Aug. 9, 2022

(54) NFC PAYMENT METHOD AND TERMINAL

(71) Applicant: HUAWEI TECHNOLOGIES CO., LTD., Guangdong (CN)

(72) Inventors: Jianxin Ding, Shenzhen (CN); Xiaona Zhao, Beijing (CN); Xinmiao Chang, Beijing (CN); Jingqing Mei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 16/626,449

(22) PCT Filed: Jun. 30, 2017

(86) PCT No.: PCT/CN2017/091292
§ 371 (c)(1),
(2) Date: Dec. 24, 2019

(87) PCT Pub. No.: WO2019/000440
PCT Pub. Date: Jan. 3, 2019

(65) Prior Publication Data
US 2020/0134601 A1  Apr. 30, 2020

(51) Int. Cl.
*G06Q 20/32* (2012.01)
*G06Q 20/08* (2012.01)
(Continued)

(52) U.S. Cl.
CPC ..... *G06Q 20/3278* (2013.01); *G06Q 20/0855* (2013.01); *G06Q 20/20* (2013.01); *G06Q 20/322* (2013.01); *G07G 1/12* (2013.01)

(58) Field of Classification Search
CPC .. G06Q 20/3278; G06Q 20/32; G06Q 20/401; G06Q 20/40; G06Q 20/20; G06Q 20/322; G06Q 20/10; G06Q 20/326; G06Q 20/0855; G06Q 20/204; G06Q 20/3224; G06Q 20/352; G06Q 20/40145; G07G 1/12
See application file for complete search history.

(56) References Cited

U.S. PATENT DOCUMENTS 10,467,615 B1 * 11/2019 Omojola ............. G06Q 20/32
10,607,210 B2 * 3/2020 Bortolotto .......... G06Q 20/3574
(Continued)

FOREIGN PATENT DOCUMENTS

AU  2016100367 A4  5/2016
CN  102325210  * 1/2012 ............ H04M 1/725
(Continued)

OTHER PUBLICATIONS

"Host-Based Card Emulation"; docs, huihoo.com; Jul. 29, 2014; https://web.archive.org/web/20140729121830/https://docs.huihoo.com/android/4.4/guide/topics/connectivity/nfc/hce.html (Year: 2014).*
(Continued)

*Primary Examiner* — Elda G Milef
(74) *Attorney, Agent, or Firm* — Fish & Richardson P.C.

(57) ABSTRACT

An NFC payment method includes: displaying, by a first terminal, a third-party payment application based on a preset trigger condition; and interacting with a second terminal by using the third-party payment application, to complete NFC payment.

11 Claims, 23 Drawing Sheets

(51) Int. Cl.
*G06Q 20/20* (2012.01)
*G07G 1/12* (2006.01)

(56) References Cited

U.S. PATENT DOCUMENTS

| | | | |
|---|---|---|---|
| 2011/0137804 A1 | 6/2011 | Peterson | |
| 2012/0036076 A1* | 2/2012 | Vanderwall | G06Q 20/28 705/75 |
| 2012/0246079 A1* | 9/2012 | Wilson | G06Q 20/3226 705/67 |
| 2013/0110657 A1* | 5/2013 | Forster | G06Q 20/208 705/17 |
| 2013/0311313 A1* | 11/2013 | Laracey | G06Q 20/327 705/16 |
| 2015/0186871 A1* | 7/2015 | Laracey | G06Q 30/06 705/41 |
| 2016/0092875 A1* | 3/2016 | Howe | G06Q 20/4016 705/44 |
| 2017/0124548 A1* | 5/2017 | Bol | G06Q 20/32 |
| 2017/0372299 A1 | 12/2017 | Zhang et al. | |

FOREIGN PATENT DOCUMENTS

| | | | | |
|---|---|---|---|---|
| CN | 102325210 A | | 1/2012 | |
| CN | 103258264 A | | 8/2013 | |
| CN | 103455913 A | | 12/2013 | |
| CN | 103914770 A | | 7/2014 | |
| CN | 105160530 A | | 12/2015 | |
| CN | 105225104 A | | 1/2016 | |
| CN | 105279646 | * | 1/2016 | G06Q 20/3278 |
| CN | 105279646 A | | 1/2016 | |
| CN | 105631659 A | | 6/2016 | |
| CN | 105825379 A | | 8/2016 | |
| CN | 106022762 A | | 10/2016 | |
| CN | 106170808 A | | 11/2016 | |

OTHER PUBLICATIONS

PCT International Search Report issued in International Application No. PCT/CN2017/091,292, dated Mar. 27, 2018, 17 pages (with English Translation).
Liu, Research and Implementation of Key Technology for Mobile Payment Based on HCE-SD, Thesis for the degree of Doctor of Computer Systems Organization, University of Computer Science and Engineering, Jun. 27, 2016, 108 pages (With English Abstract).
Blog.sina.com [Online], "The Seventh Study of PBOC Specification—Application Choice", May 30, 2014 [retrieved on Jun. 20, 2020], retrieved from: URL <http://blog.sina.com.cn/s/blog_a20257d80101n15o.html>, 27 pages (With English Translation).
Blog.sina.com [Online], "The Eighth Research of PBOC Specification—GPO Command", May 30, 2014 [retrieved on Jun. 20, 2020], Retrieved from: URL <http://blog.sina.com.cn/s/blog_a20257d80101n17j.html>, 13 pages (With English Translation).
Office Action issued in Chinese Application No. 201780012840.1 dated Apr. 22, 2020, 48 pages (With English Translation).
Extended European Search Report issued in European Application No. 17915360.6 dated Apr. 6, 2020, 8 pages.
Svitok, "Implementation of Payment Protocol on NFC-enabled Mobile Phone," Diploma Thesis, Faculty of Informatics Masaryk University, Feb. 2014, 92 pages.

\* cited by examiner

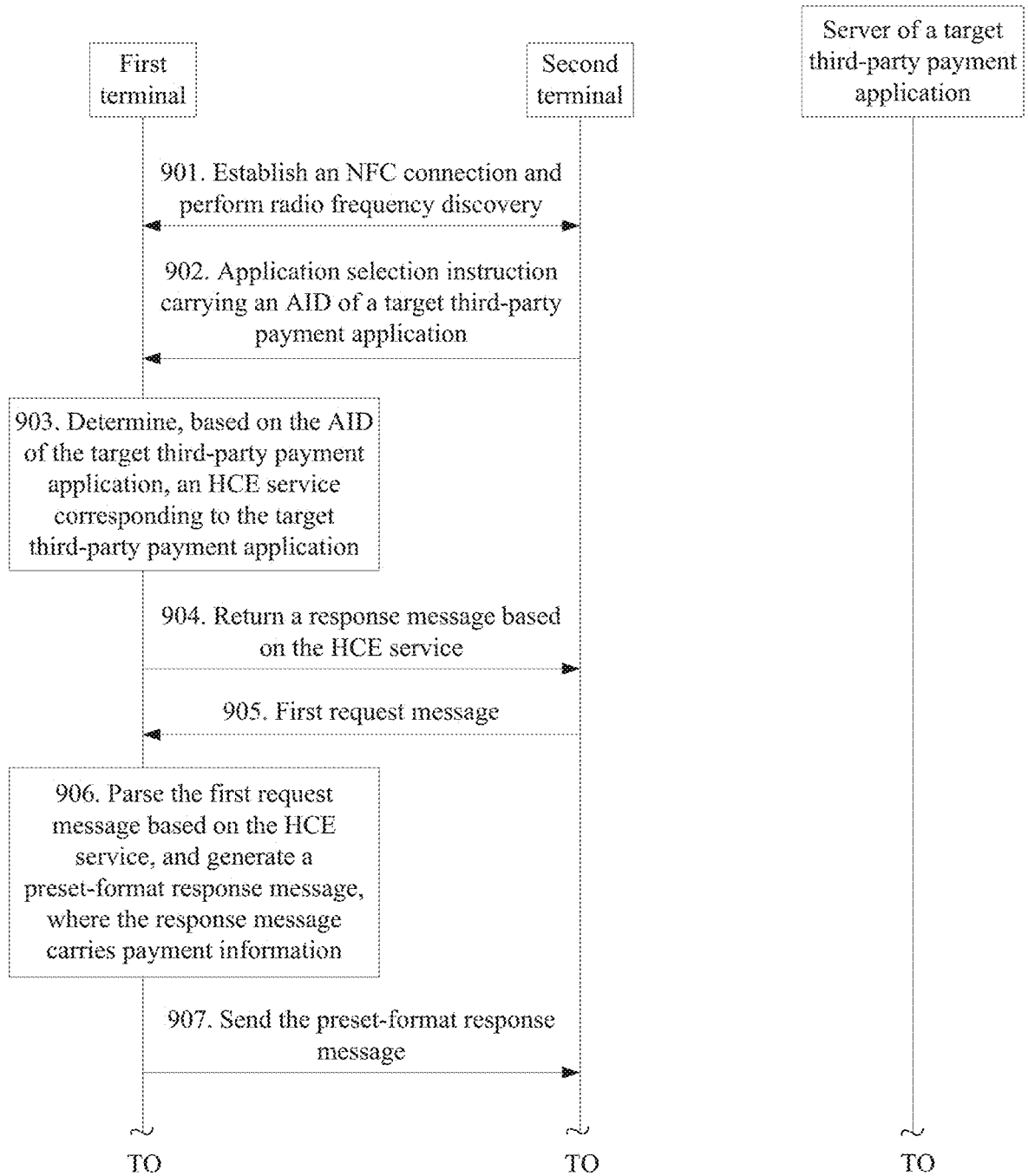
FIG. 10c1

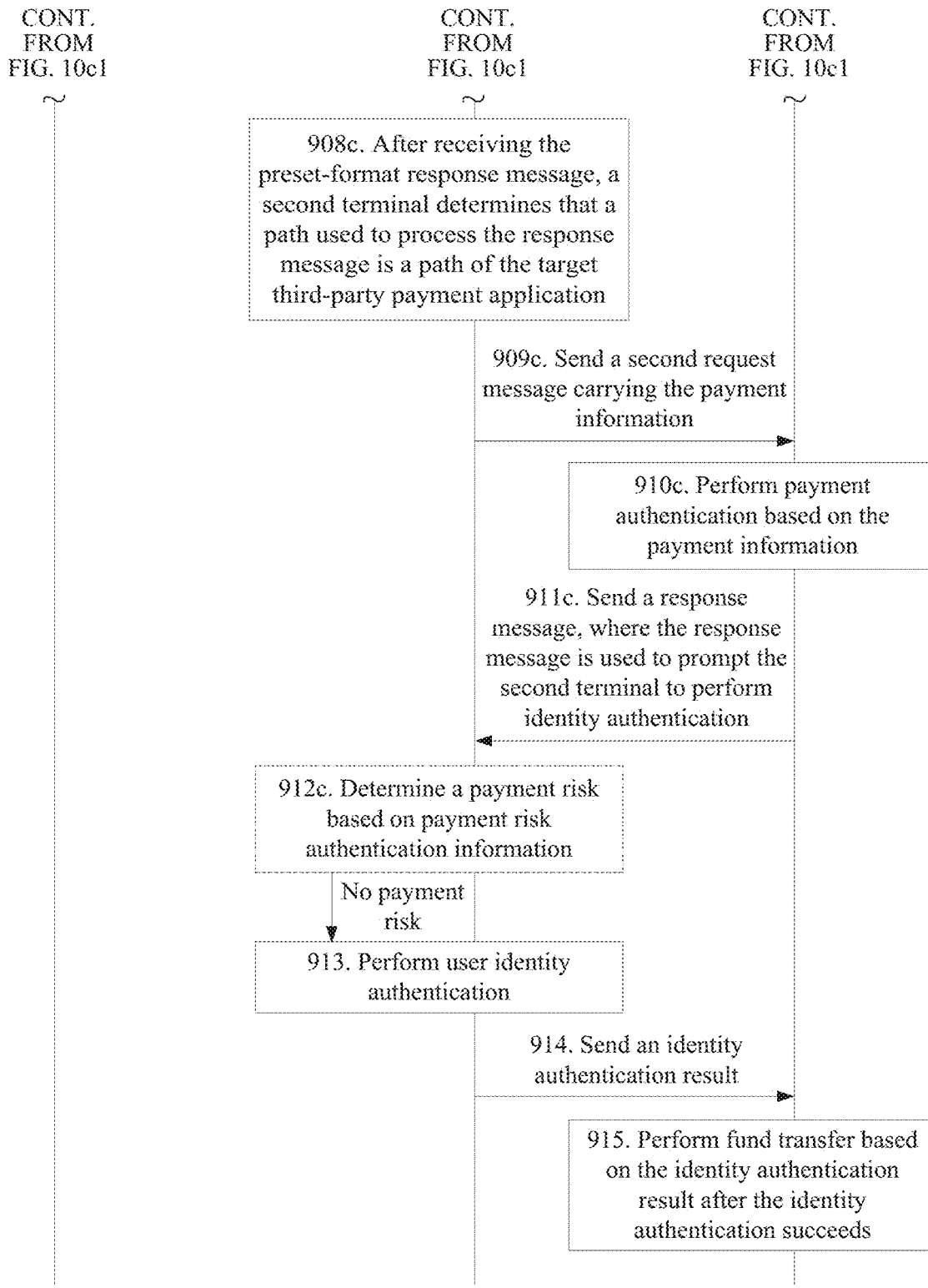
FIG. 10c2

NFC PAYMENT METHOD AND TERMINAL

CROSS-REFERENCE TO RELATED APPLICATIONS

This application is a National Stage of International Application No. PCT/CN2017/091292, filed on Jun. 30, 2017, which is hereby incorporated by reference in its entirety.

TECHNICAL FIELD

This application relates to the field of terminal technologies, and in particular, to an NFC payment method and a terminal.

BACKGROUND

With development of Internet banking, it is popular that users make payment by using applications (application, APP) installed in terminals.

Common APPs include third-party payment applications such as WeChat Pay and Alipay. An implementation solution for using a third-party payment application to make payment is: A payer's terminal scans a quick response code provided by a payee or a payee's terminal scans a quick response code provided by a payer; the terminal scanning the quick response code sends, to a server, content carried in the quick response code, so that the server performs authentication; and then the terminal makes payment after the authentication succeeds.

Referring to FIG. 1A and FIG. 1B, for example, when a user makes payment by using Alipay in a mobile phone, the user needs to start an Alipay application on a home screen 101 of the mobile phone. Then, the user selects a "payment" function on a displayed screen 102 of the Alipay application, and the Alipay application loads a screen 103 that displays a quick response code. A point of sale (Point of Sale, POS) terminal of a merchant may scan the quick response code to receive payment (which is shown in a procedure 104 in FIG. 1B). It can be learnt that during the process of making payment by scanning the quick response code, a lot of user operations are required. The user usually needs to operate the terminal to start the third-party payment application, and select the payment function to invoke a quick response code. In addition, if a screen of the terminal has been locked, the user further needs to perform an operation of unlocking the terminal before starting the Alipay application. In conclusion, in the prior art, operations are troublesome when the third-party payment application is used to make payment.

SUMMARY

Embodiments of this application provide an NFC payment method and a terminal, to resolve a prior-art problem that operations are troublesome when a third-party payment application is used to make payment.

To achieve the foregoing objective, the following technical solutions are used in the embodiments of this application.

According to a first aspect, an NFC payment method is provided, where the method includes: displaying, by a first terminal, at least one third-party payment application based on a preset trigger condition; and determining, by the first terminal, one of the at least one third-party payment application as a target third-party payment application, and interacting with a second terminal by using the target third-party payment application, to complete NFC payment.

According to the NFC payment method provided in this embodiment of this application, the first terminal and the second terminal can use the third-party payment application to make NFC payment. In comparison with the prior art that a third-party payment application can be used to make payment only by scanning a quick response code, in the NFC payment method provided in this embodiment of this application, a user only needs to perform a contact operation to use the third-party payment application to make payment. This can reduce user operations and increase a speed for making payment by using the third-party payment application.

In a possible design, the displaying, by a first terminal, at least one third-party payment application based on a preset trigger condition includes: displaying, by the first terminal, the at least one third-party payment application when the first terminal detects a radio frequency (Radio Frequency, RE) field of the second terminal.

In a possible design, the displaying, by a first terminal, at least one third-party payment application based on a preset trigger condition includes: receiving, by the first terminal, a quick operation of a user; and displaying the at least one third-party payment application based on the quick operation.

The quick operation includes pressing a preset physical button, entering preset fingerprint information, entering a specific voice instruction, or entering a preset gesture.

In a possible design, the determining, by the first terminal, a target third-party payment application includes: receiving, by the first terminal, a selection operation of the user for selecting a third-party payment application from the at least one third-party payment application; and determining, as the target third-party payment application, the third-party payment application selected by the user.

In a possible design, the first terminal receives, through an NFC connection established between the first terminal and the second terminal, an application selection instruction that carries an application identifier (application identification, AID) of the target third-party payment application and that is sent by the second terminal; and The first terminal displays the target third-party payment application based on the application selection instruction.

In a possible design, when the displaying, by a first terminal, at least one third-party payment application, the method further includes: displaying, by the first terminal, a card application supporting NFC payment.

In a possible design, before the interacting, by the first terminal, with a second terminal by using the target third-party payment application, to complete NFC payment, the method further includes: determining, by the first terminal, that user identity authentication succeeds.

In a possible design, after the interacting, by the first terminal, with a second terminal by using the target third-party payment application, to complete NFC payment, the method further includes: informing, by the first terminal, the user that the NFC payment has been completed.

In a possible design, the interacting, by the first terminal, with a second terminal by using the target third-party payment application, to complete NFC payment includes: receiving, by the first terminal through an NFC connection established between the first terminal and the second terminal, a request message that is used to obtain payment information of the target third-party payment application and that is sent by the second terminal; and sending, by the first terminal, a preset-format response message to the second terminal based on the request message through the NFC connection, where the preset-format response message carries the payment information of the target third-party payment application.

In a possible design, before the receiving, by the first terminal through an NFC connection established between the first terminal and the second terminal, a request message sent by the second terminal, the method further includes: receiving, by the first terminal through the established NFC connection, an application selection instruction sent by the second terminal, where the application selection instruction carries an AID of the target third-party payment application; and determining, by the first terminal, a first service based on the AID of the target third-party payment application, where the first service is a service corresponding to the target third-party payment application; and correspondingly, the sending, by the first terminal, a preset-format response message to the second terminal based on the request message through the NFC connection includes: parsing, by the first terminal, the request message based on the first service, and encapsulating the payment information of the target third-party payment application into the preset-format response message; and sending, by the first terminal, the preset-format response message to the second terminal through the established NFC connection.

In a possible design, the first terminal stores a correspondence between the AID of the target third-party payment application and a service type; and correspondingly, the determining, by the first terminal, a first service based on the AID of the target third-party payment application includes: determining, by the first terminal, the first service based on the correspondence.

The first service is a specific type of host card emulation (Host-based Card Emulation, HCE) service.

In a possible design, the first terminal stores registration information of the target third-party payment application, where the registration information includes the AID of the target third-party payment application and representation information of the service type, and the registration information is used to determine the correspondence between the AID of the target third-party payment application and the service type.

In a possible design, the receiving, by the first terminal through an NFC connection established between the first terminal and the second terminal, a request message sent by the second terminal includes: receiving, by the first terminal through the NFC connection, a request message for NFC tag reading sent by the second terminal; and correspondingly, the sending, by the first terminal, a preset-format response message to the second terminal based on the request message through the NFC connection includes: obtaining, by the first terminal, the preset-format response message that is stored in a pre-generated NFC tag, and sending the preset-format response message to the second terminal through the NFC connection.

In a possible design, after the determining, by the first terminal, a target third-party payment application, the method further includes: generating, by the first terminal, the preset-format response message by using the payment information of the target third-party payment application, and encapsulating the preset-format response message into the NFC tag.

According to a second aspect, an NFC payment method is provided, where the method is applied to a second terminal and the method includes: sending, by the second terminal to a first terminal through an NFC connection established between the second terminal and the first terminal, a request message used to obtain payment information of a target third-party payment application in the first terminal; receiving, by the second terminal through the NFC connection, a preset-format response message sent by the first terminal, where the preset-format response message carries the payment information of the target third-party payment application; and interacting, by the second terminal, with a server of the target third-party payment application based on the preset-format response message, to complete NFC payment.

In a possible design, before the sending, by the second terminal; a request message to a first terminal through an NFC connection established between the second terminal and the first terminal, the method further includes: sending, by the second terminal, an application selection instruction to the first terminal through the NFC connection established between the second terminal and the first terminal, where the application selection instruction includes an application identifier of the target third-party payment application; and receiving, by the second terminal, a response message that is sent by the first terminal based on the application selection instruction; and correspondingly, the sending, by the second terminal, a request message to a first terminal through an NFC connection established between the second terminal and the first terminal includes: sending, by the second terminal, the request message to the first terminal based on the response message through the NFC connection established between the second terminal and the first terminal.

In a possible design, the sending, by the second terminal, a request message to a first terminal through an NFC connection established between the second terminal and the first terminal includes: sending, by the second terminal, a request message for NFC tag reading to the first terminal through the established NFC connection.

In a possible design, the preset-format response message further carries a function type, and the function type is used to indicate a first target function to be performed by the first terminal; and correspondingly, the interacting, by the second terminal, with a server of the target third-party payment application based on the preset-format response message, to complete NFC payment includes: determining, by the second terminal based on the function type, a second target function corresponding to the first target function; and sending the payment information to the server of the target third-party payment application based on the second target function.

The function type is registered by the target third-party payment application from a system when the target third-party payment application is being installed in the second terminal, and is used to indicate that the second target function of the target third-party payment application is capable of processing a message carrying the function type. Optionally, the function type includes a payment making type and a payment receiving type.

In a possible design, in a possible scenario of actual application, the second terminal not only can communicate with a server corresponding to an application for a card such as a bank card, but also can communicate with a server of a third-party payment application such as WeChat Pay. This NFC payment may be NFC payment made by using an application for a card such as a bank card, or may be NFC payment made by using a third-party payment application such as WeChat Pay; therefore, the second terminal needs to select a corresponding server based on an application used to make this NFC payment, to establish a connection to and exchange data with the server. Specifically, when the application that is selected by a user on the second terminal to complete this NFC payment is the target third-party payment application, or when the second terminal determines, through negotiation with the first terminal, that the application used to make this NFC payment is the target third-party payment application, or when an NFC tag that is generated by the first terminal through encapsulation and that is read by the second terminal carries an application identifier and the application identifier is the application identifier of the target third-party payment application, the second terminal determines to communicate with the server of the target third-party payment application, and therefore establishes a connection to the server of the target third-party payment application and communicates with the server. That the second terminal performs determining through negotiation with the first terminal is specifically: the second terminal determines whether the payment application selected based on the application selection instruction is the target third-party payment application in the first terminal or a non-third-party payment application such as a bank card application. If the payment application is the target third-party payment application, the second terminal determines to communicate with the server of the third-party payment application; otherwise, the second terminal determines to communicate with a server corresponding to a bank card application.

In a possible design, the interacting, by the second terminal, with a server of the target third-party payment application based on the preset-format response message, to complete NFC payment includes: determining, by the second terminal, a payment risk based on payment risk authentication information; and after determining that there is no payment risk, sending, by the second terminal, the payment information of the target third-party payment application to the server of the target third-party payment application, to request the server of the target third-party payment application to complete NFC payment.

The payment risk authentication information is carried in the preset-format response message or is obtained by the second terminal from the server of the target third-party payment application.

In a possible design, the payment risk authentication information includes location information of the first terminal; and correspondingly, the determining, by the second terminal, a payment risk based on payment risk authentication information includes: determining, by the second terminal, location information of the second terminal; and when the location information of the second terminal matches the location information of the first terminal, determining, by the second terminal, that there is no payment risk.

In a possible design, the interacting, by the second terminal, with a server of the target third-party payment application based on the preset-format response message; to complete NFC payment includes: sending, by the second terminal, the payment information of the target third-party payment application to the server of the target third-party payment application, so that the server of the target third-party payment application performs payment authentication based on the payment information, determines a payment risk based on payment risk authentication information, and completes NFC payment when successfully performing the payment authentication and determining that there is no payment risk.

The payment risk authentication information is obtained from the second terminal or is generated by the server of the target third-party payment application.

In a possible design, the interacting, by the second terminal, with a server of the target third-party payment application based on the preset-format response message, to complete NFC payment includes: sending, by the second terminal, the payment information of the target third-party payment application to the server of the target third-party payment application; receiving, by the second terminal, an identity authentication request sent by the server of the target third-party payment application; determining, by the second terminal, a payment risk based on payment risk authentication information; and after determining that there is no payment risk; sending an identity authentication result to the server of the target third-party payment application, so that the server of the target third-party payment application completes NFC payment based on the identity authentication result and the payment information.

The payment risk authentication information is carried in the preset-format response message or is obtained by the second terminal from the server of the target third-party payment application.

According to a third aspect, an NFC payment method is provided, including: displaying, by a first terminal, a first screen, where the first screen displays an icon of at least one third-party payment application; receiving, by the first terminal, a selection operation of a user for selecting an icon of a target third-party payment application on the first screen; and in response to the selection operation, interacting, by the first terminal, with a second terminal by using the target third-party payment application, to complete NFC payment.

In a possible design, the displaying, by a first terminal, a first screen includes: when the first terminal is in a screen locked state, receiving, by the first terminal, a quick operation entered by the user; and displaying, by the first terminal, the first screen in response to the quick operation.

The quick operation includes pressing a preset physical button, entering preset fingerprint information, entering a specific voice instruction; or entering a preset gesture.

In a possible design, the displaying, by a first terminal, a first screen includes: displaying, by the first terminal, the first screen when the first terminal comes into contact with the second terminal.

In a possible design, before the interacting, by the first terminal, with a second terminal to complete NFC payment, the method further includes: displaying, by the first terminal, a second screen in response to the selection operation, where the second screen displays first prompt information, and the first prompt information is used to prompt the user to perform identity authentication; and correspondingly, in response to an operation of successful user identity authentication, interacting, by the first terminal, with the second terminal to complete NFC payment.

In a possible design, after the interacting, by the first terminal, with a second terminal to complete NFC payment, the method further includes: displaying, by the first terminal, second prompt information, where the second prompt information is used to inform the user that the NFC payment has been completed.

According to a fourth aspect, a terminal is provided, where the terminal serving as a first terminal includes one or more processors, a display, and a memory, where the memory stores one or more programs, the one or more programs include an instruction, and when the instruction is executed by the first terminal, the first terminal is enabled to perform the following steps: the display displays at least one third-party payment application based on a preset trigger condition; and the processor determines a target third-party payment application from the at least one third-party payment application displayed on the display, and interacts with a second terminal by using the target third-party payment application, to complete NFC payment.

In a possible design, the display is further configured to display the at least one third-party payment application when the processor detects a radio frequency field of the second terminal.

In a possible design, the first terminal further includes an input device, where the input device is configured to receive a quick operation of a user, where the quick operation includes pressing a preset physical button, entering preset fingerprint information, entering a specific voice instruction, or entering a preset gesture; and the display is further configured to display the at least one third-party payment application based on the quick operation received by the input device.

In a possible design, the input device is further configured to receive a selection operation of the user for selecting a third-party payment application from the at least one third-party payment application; and the processor is further configured to determine, as the target third-party payment application, the third-party payment application selected by the user.

In a possible design, the display is further configured to: when displaying the at least one third-party payment application, display a card application supporting NFC payment.

In a possible design, the processor is further configured to determine that user identity authentication succeeds.

In a possible design, the display is further configured to display prompt information informing the user that the NFC payment has been completed.

In a possible design, the terminal serving as the first terminal further includes a receiver and a transmitter, where the receiver is configured to receive, through an NFC connection established between the first terminal and the second terminal, a request message sent by the second terminal, where the request message is used to obtain payment information of the target third-party payment application; and the transmitter is configured to send a preset-format response message to the second terminal through the NFC connection, where the preset-format response message carries the payment information of the target third-party payment application.

In a possible design, the receiver is further configured to receive, through the NFC connection established between the first terminal and the second terminal, an application selection instruction sent by the second terminal, where the application selection instruction carries an AID of the target third-party payment application; the processor is further configured to determine a first service based on the AID of the target third-party payment application, where the first service is a service corresponding to the target third-party payment application; the processor is further configured to parse the request message based on the first service, and encapsulate the payment information of the target third-party payment application into the preset-format response message; and the transmitter is further configured to send the preset-format response message to the second terminal through the NFC connection.

In a possible design, the memory stores a correspondence between the AID of the target third-party payment application and a service type; and the processor is further configured to determine the first service based on the correspondence.

In a possible design, the memory stores registration information of the target third-party payment application, where the registration information includes the AID of the target third-party payment application and representation information of the service type, and the registration information is used to determine the correspondence between the AID of the target third-party payment application and the service type.

In a possible design, the receiver is further configured to receive, through the NFC connection established between the first terminal and the second terminal, a request message for NFC tag reading sent by the second terminal; the processor is further configured to obtain the preset-format response message that is stored in a pre-generated NFC tag; and the transmitter is further configured to send the preset-format response message to the second terminal through the NFC connection.

In a possible design, the processor is further configured to: generate the preset-format response message by using the payment information of the target third-party payment application, and encapsulate the preset-format response message into the NFC tag.

According to a fifth aspect, a terminal is provided, where the terminal serving as a second terminal includes one or more processors, a transmitter, a receiver, and a memory, where the memory stores one or more programs, the one or more programs include an instruction, and when the instruction is executed by the second terminal, the second terminal is enabled to perform the following steps: the transmitter sends a request message to a first terminal through an NFC connection established between the second terminal and the first terminal, where the request message is used to obtain payment information of a target third-party payment application in the first terminal; the receiver receives, through the NFC connection, a preset-format response message sent by the first terminal, where the preset-format response message carries the payment information of the target third-party payment application; and the processor interacts with a server of the target third-party payment application based on the preset-format response message, to complete NFC payment.

In a possible design, the transmitter is further configured to send an application selection instruction to the first terminal through the NFC connection established between the second terminal and the first terminal, where the application selection instruction includes an application identifier of the target third-party payment application; the receiver is further configured to receive a response message that is sent by the first terminal based on the application selection instruction; and the transmitter is further configured to send the request message to the first terminal based on the response message through the NFC connection established between the second terminal and the first terminal.

In a possible design, the transmitter is further configured to send a request message for NFC tag reading to the first terminal through the NFC connection established between the second terminal and the first terminal.

In a possible design, the preset-format response message further carries a function type, and the function type is used to indicate a first target function to be performed by the first terminal; the processor is further configured to determine, based on the function type, a second target function corresponding to the first target function; and the transmitter is further configured to send the payment information to the server of the target third-party payment application based on the second target function.

The function type is registered by the target third-party payment application from a system when the target third-party payment application is being installed in the second terminal, and is used to indicate that the target function of the target third-party payment application is capable of processing a message including the function type. Optionally, the function type includes payment making and payment receiving.

In a possible design, the processor is further configured to determine a payment risk based on payment risk authentication information; and the transmitter is further configured to: after it is determined that there is no payment risk, send the payment information of the target third-party payment application to the server of the target third-party payment application, to request the server of the target third-party payment application to complete NFC payment.

The payment risk authentication information is carried in the preset-format response message or is obtained by the second terminal from the server of the target third-party payment application.

In a possible design, the payment risk authentication information includes location information of the first terminal; the processor is further configured to: determine location information of the second terminal; and when the location information of the second terminal matches the location information of the first terminal, determine, for the second terminal, that there is no payment risk.

In a possible design, the transmitter is further configured to send the payment information of the target third-party payment application to the server of the target third-party payment application, so that the server of the target third-party payment application performs payment authentication based on the payment information, determines a payment risk based on payment risk authentication information, and completes NFC payment when successfully performing the payment authentication and determining that there is no payment risk.

The payment risk authentication information is obtained from the second terminal or is generated by the server of the target third-party payment application.

In a possible design, the transmitter is further configured to send the payment information of the target third-party payment application to the server of the target third-party payment application; the receiver is further configured to receive an identity authentication request sent by the server of the target third-party payment application; the processor is further configured to determine a payment risk based on payment risk authentication information, where the payment risk authentication information is carried in the preset-format response message or is obtained by the second terminal from the server of the target third-party payment application; and the transmitter is further configured to: after it is determined that there is no payment risk, send an identity authentication result to the server of the target third-party payment application, so that the server of the target third-party payment application completes NFC payment based on the identity authentication result and the payment information.

According to a sixth aspect, a terminal is provided, where the terminal serving as a first terminal includes one or more processors, a display, an input device, and a memory, where the memory stores one or more programs; the one or more programs include an instruction, and when the instruction is executed by the first terminal; the first terminal is enabled to perform the following steps: the display displays a first screen, where the first screen displays at least one third-party payment application; the input device receives a selection operation of a user for selecting a target third-party payment application on the first screen; and in response to the selection operation, the processor interacts with a second terminal by using the target third-party payment application, to complete NFC payment.

In a possible design, the input device is further configured to: when the first terminal is in a screen locked state, receive a quick operation entered by the user; and the display is further configured to display the first screen in response to the quick operation.

The quick operation includes pressing a preset physical button, entering preset fingerprint information, entering a specific voice instruction, or entering a preset gesture.

In a possible design, the display is further configured to display the first screen when the first terminal comes into contact with the second terminal.

In a possible design, the display is further configured to display a second screen in response to the selection operation, where the second screen displays first prompt information, and the first prompt information is used to prompt the user to perform identity authentication; and the processor is further configured to: in response to an operation of successful user identity authentication, interact with the second terminal to complete NFC payment.

In a possible design, the display is further configured to display second prompt information, where the second prompt information is used to inform the user that the NFC payment has been completed.

According to a seventh aspect, a computer-readable storage medium is provided, where the computer-readable storage medium stores an instruction, and when the instruction runs on a terminal, the terminal is enabled to perform the NFC payment method according to the first aspect.

According to an eighth aspect, a computer program product including an instruction is provided, where when the computer program product runs on a terminal, the terminal is enabled to perform the NFC payment method according to the first aspect.

According to a ninth aspect, a computer-readable storage medium is provided, where the computer-readable storage medium stores an instruction, and when the instruction runs on a terminal, the terminal is enabled to perform the NFC payment method according to the second aspect.

According to a tenth aspect, a computer program product including an instruction is provided, where when the computer program product runs on a terminal, the terminal is enabled to perform the NFC payment method according to the second aspect.

BRIEF DESCRIPTION OF DRAWINGS

FIG. 10a, FIG. 10b, FIG. 10c1, FIG. 10c2, FIG. 11a, FIG. 11b, and FIG. 11c are schematic flowcharts of NFC payment methods according to an embodiment of this application;

DESCRIPTION OF EMBODIMENTS

Figure 1A:
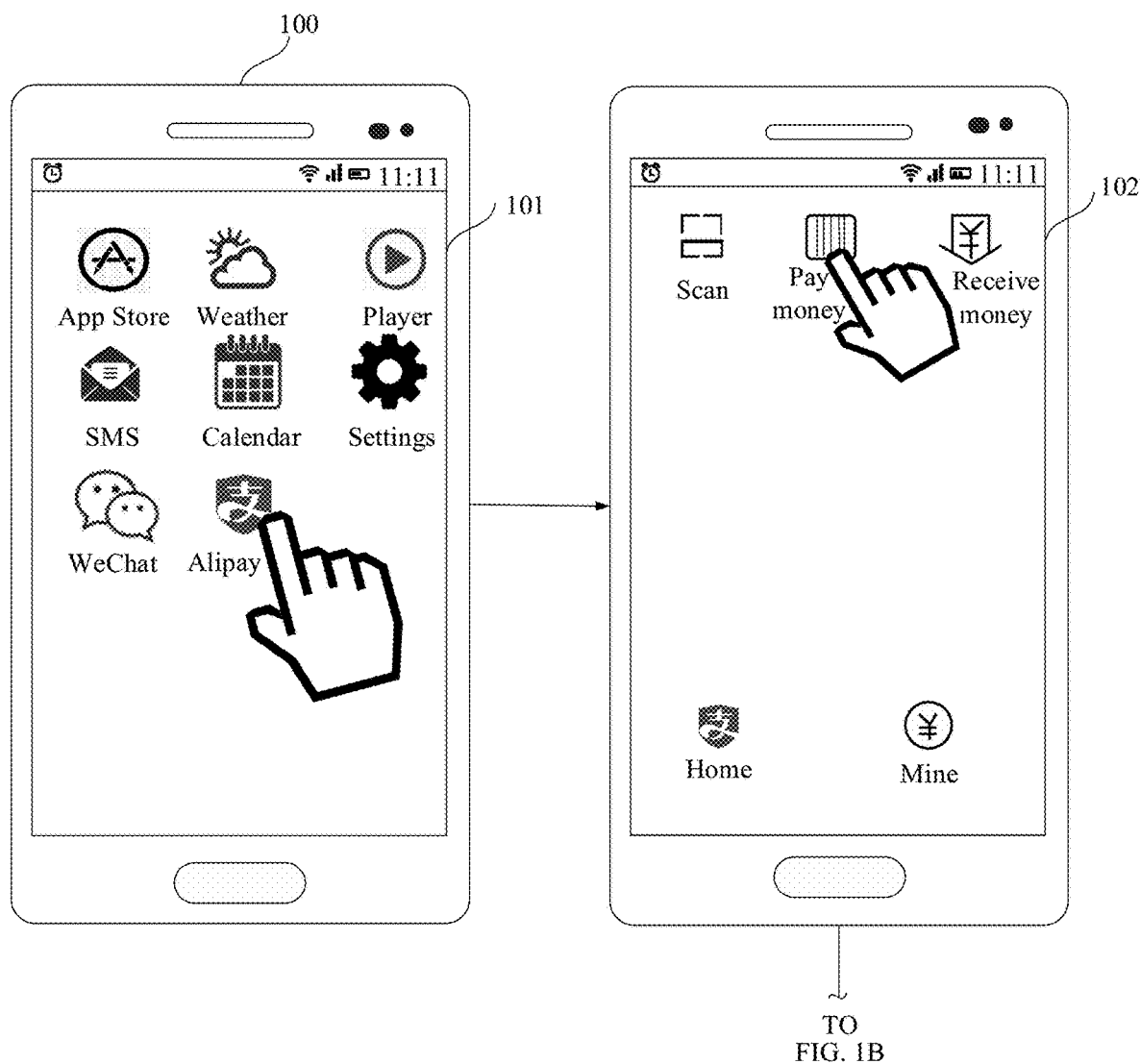
FIG. 1A and FIG. 1B are a schematic diagram of a process in which a third-party payment application makes payment by using a quick response code in the prior art.

Near field communication (Near Field Communication, NFC) is a short-range wireless connection technology based on a radio frequency identification (Radio Frequency Identification, RFID) technology. The NFC technology implements short-range communication between NFC terminals through radio frequency field sensing. Two NFC terminals can exchange information and content and implement transaction in a fast, secure, and contactless manner by touching them together or bringing them into proximity.

Specifically, working modes of an NFC terminal may be classified into three types: 1. Peer-to-peer (Peer-to-Peer, P2P) mode, where this mode is specifically applied to scenarios such as versitcard sharing and web page sharing. 2. Card emulation (Card Emulation, CE) mode, where this mode is specifically applied to identity authentication or mobile payment scenarios in which a bank card, a bus pass, a membership card, a coupon, an identity card, or the like is used. 3. Reader/Writer (Reader/Writer, R/W) mode, where this mode is specifically applied to a tag reading/writing scenario, and identity authentication or mobile payment scenarios in which a point of sale (Point of Sale, POS) machine for bank cards, a POS machine for bus passes, or the like is used.

That the NFC terminal is a mobile phone is used as an example. Currently, when a card application provided by a financial institution such as a bank is installed in a mobile phone, the mobile phone can complete payment in a card emulation working mode. To be specific, a card application is downloaded to and installed in the mobile phone, and the card application is bound to a physical card to implement card emulation for the mobile phone. In this way, the mobile phone can replace a conventional physical integrated circuit (IC, Integrated Circuit) card to complete payment directly.

However, when a user replaces a mobile phone, the user needs to perform the foregoing card binding process again: downloading and installing a card application, and binding the card application to a physical card. Therefore, this implementation is relatively inconvenient for a user in a scenario in which the user replaces a mobile phone.

Compared with a card application, third-party payment applications such as WeChat Pay and Alipay are corresponding to an account and a password of a user, and are free from impact caused by mobile phone replacement of the user. In other words, to use a third-party payment application to make payment, the user only needs to log in to the third-party payment application on any mobile phone by using account information such as a registered account and a password. Therefore, the third-party payment application is more convenient in this sense. However, during payment, the third-party payment application usually implements payment by scanning a quick response code. In this sense, this implementation has disadvantages of troublesome operations and slow payment. In addition, there may be security risks such as a user's fund loss. For example, a merchant's quick response code is maliciously replaced, and consequently a transaction fund cannot be paid to the merchant's account; or a quick response code generated by a consumer's mobile phone is captured by a malicious third party to make payment in other places, causing the consumer's fund to be stolen.

In the prior art, when a third-party payment application makes payment by scanning a quick response code, operations are troublesome, a payment speed is low, and a security risk may exist. In an existing mobile phone card emulation mode, a card application needs to be downloaded and bound after a mobile phone is replaced. To resolve the foregoing problems, in the embodiments of this application, an existing third-party payment application is used together with an NFC technology, to provide a method for NFC payment by using a third-party payment application.

The NFC payment method provided in the embodiments of this application is applied to a scenario in Which payment is made between two different terminals supporting an NFC function. For ease of description, in the embodiments of this application, the two different terminals supporting an NFC function are referred to as a first terminal and a second terminal. The first terminal may be a mobile phone, a tablet computer, a notebook computer, an ultra-mobile personal computer, a netbook, a personal digital assistant, a wearable device, or the like. The second terminal may be a device such as a mobile phone, a tablet computer, a notebook computer, a wearable device, or a POS machine.

Figure 2A:
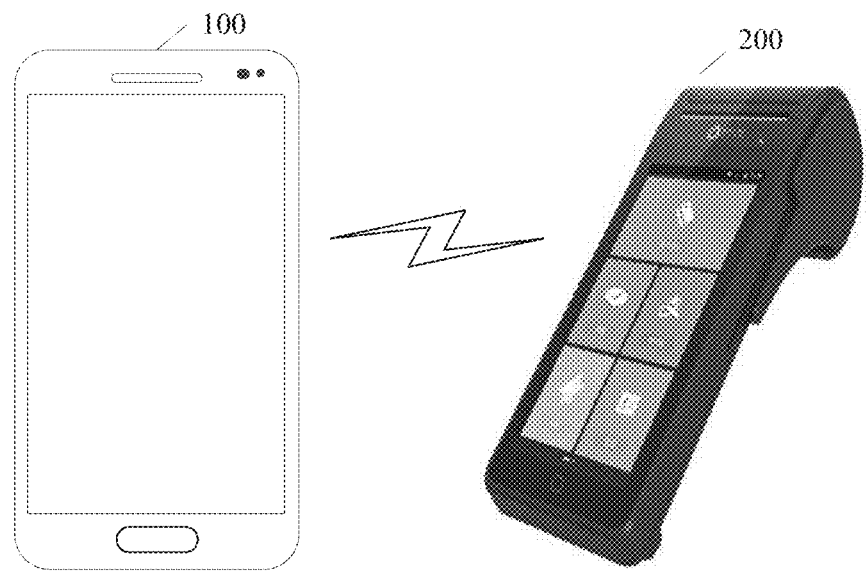
FIG. 2a is a schematic diagram of an application scenario of an NFC payment method according to an embodiment of this application.

For example, as shown in FIG. 2a, the first terminal mentioned in the embodiments of this application may be a mobile phone 100, and the second terminal in the embodiments of this application may be a POS terminal 200.

Figure 2B:
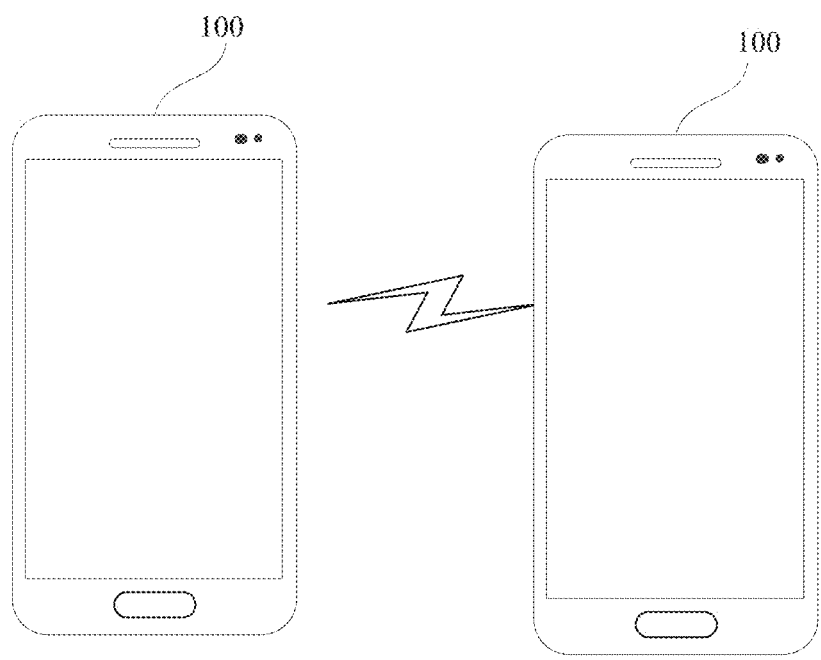
FIG. 2b is a schematic diagram of another application scenario of an NFC payment method according to an embodiment of this application.

For example, as shown in FIG. 2b, both the first terminal and the second terminal mentioned in the embodiments of this application may be mobile phones 100.

Both the first terminal and the second terminal mentioned in the embodiments of this application support an NFC function. In addition, an application that can support third-party payment, that is, a third-party payment application, is installed in the first terminal and the second terminal.

The third-party payment application mentioned in the embodiments of this application is mainly an application that is provided by a payment service provider and that has an online card binding function (it can be understood that an association between an account of the third-party payment application and a card bound online to the account can be recorded on a server side for storage, and there is no need to download a card application and personal data to a terminal to emulate a card). In other words, the third-party payment application mentioned in the embodiments of this application includes but is not limited to an application that provides only online card binding and online payment functions, or an application that provides at least online card binding and online payment functions. For example, the third-party payment application includes WeChat Pay, Alipay, and the like.

It should be noted that the third-party payment application mentioned in the embodiments of this application usually does not include a payment application having an offline NFC payment function, for example, a payment application that needs to download a card application and personal data to a terminal to implement a card emulation function, such as various bank card applications.

Figure 3:
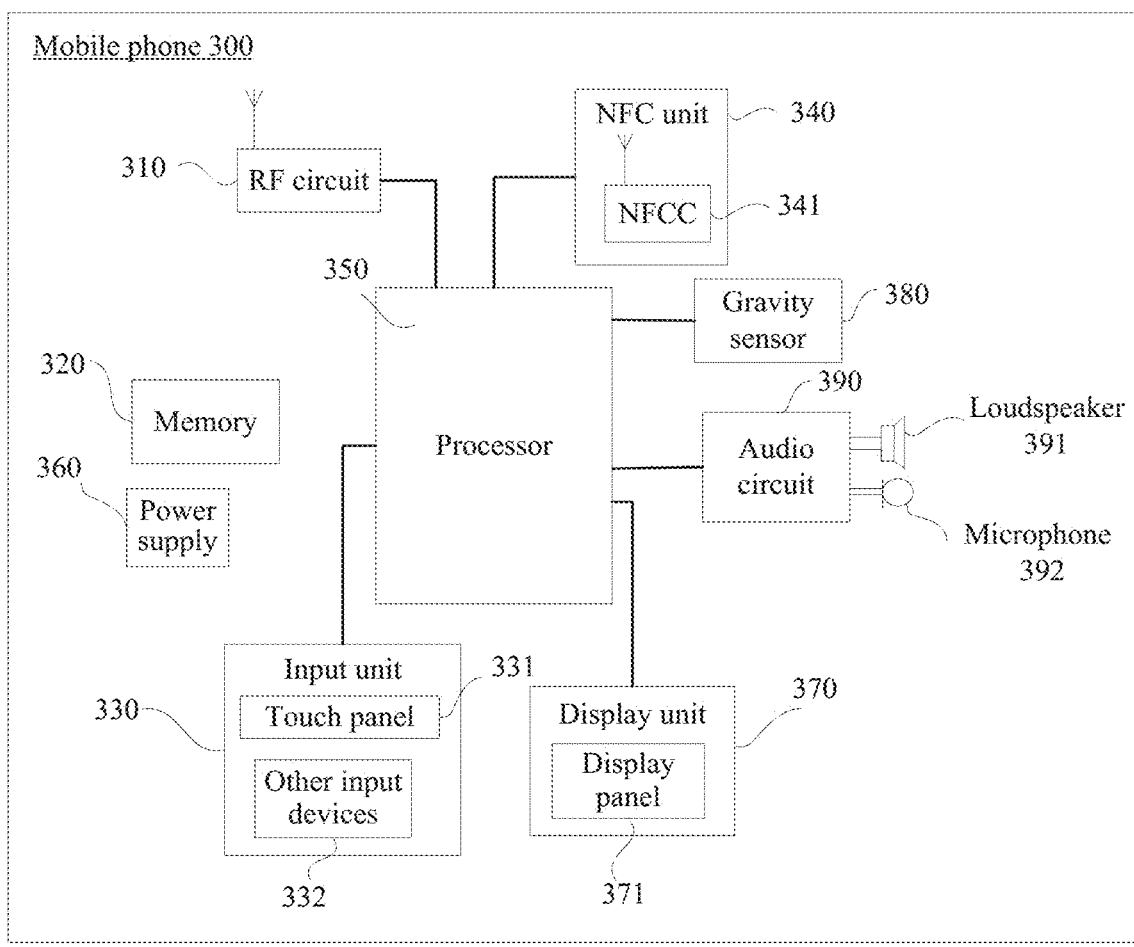
FIG. 3 is a schematic structural diagram of a mobile phone according to an embodiment of this application.

For example, both the first terminal and the second terminal are mobile phones. As shown in FIG. 3, a mobile phone 300 includes components such as a radio frequency (radio frequency, RF) circuit 310, a memory 320, an input unit 330, an NFC chip 340, a processor 350, a power supply 360, a display unit 370, a gravity sensor 380, and an audio circuit 390. A person skilled in the art may understand that a structure of the mobile phone shown in FIG. 3 does not constitute any limitation on the mobile phone, and the mobile phone may include more or fewer components than those shown in the figure, or a combination of some components, or a different arrangement of the components.

The following separately describes the functional components of the mobile phone 300.

The RF circuit 310 may be configured to: receive and send signals in an information receiving/sending process or a call process. Particularly, the RF circuit 310 receives downlink information of a base station and sends the downlink information to the processor 350 for processing; and sends uplink data to the base station. Generally, the RF circuit includes but is not limited to an antenna, at least one amplifier, a transceiver, a coupler, a low noise amplifier (low noise amplifier, LNA), and a duplexer. In addition, the RF circuit 310 may also communicate with a network and other devices through wireless communication. For the wireless communication, any communications standard or protocol may be used, including but not limited to Global System for Mobile Communications (global system of mobile communication, GSM), General Packet Radio Service (general packet radio service, GPRS), Code Division Multiple Access (code division multiple access, CDMA), Wideband Code Division Multiple Access (wideband code division multiple access, WCDMA), Long Term Evolution (long term evolution, LTE), email, and short message service (short messaging service, SMS).

The memory 320 may be configured to store a software program and a module. The processor 350 performs various function applications and data processing of the mobile phone 300 by running the software program and the module that are stored in the memory 320. The memory 320 may mainly include a program storage area and a data storage area. The program storage area may store an operating system and an application (Application, APP) required by at least one function, such as a voice playback function and an image playback function. The data storage area may store data (such as audio data, image data, and a phone book) created based on use of the mobile phone 300, and the like. In addition, the memory 320 may include a high-speed random access memory, and may further include a non-volatile memory such as at least one magnetic disk storage device, a flash memory device, or another volatile solid-state storage device.

The input unit 330 may be configured to receive input digital or character information and generate a key signal input related to user setting and function control of the mobile phone 300. Specifically, the input unit 330 may include a touchscreen 331 and other input devices 332. The touchscreen 331, also referred to as a touch panel, may collect a touch operation performed by a user on or near the touchscreen 331 (for example, an operation performed by the user on the touchscreen 331 or near the touchscreen 331 by using any proper object or accessory, such as a finger or a stylus), and drive a corresponding connection apparatus according to a preset program. Optionally, the touchscreen 331 may include two parts: a touch detection apparatus and a touch controller. The touch detection apparatus detects a touch location of the user, detects a signal generated by a touch operation, and transmits the signal to the touch controller. The touch controller receives touch information from the touch detection apparatus, converts the touch information into contact coordinates, and sends the contact coordinates to the processor 350, and is also capable of receiving and executing a command sent by the processor 350. In addition, the touchscreen 331 may be implemented by using a plurality of types, such as a resistive type, a capacitive type, an infrared type, and a surface acoustic wave type. In addition to the touchscreen 331, the input unit 330 may further include the other input devices 332. Specifically, the other input devices 332 may include but are not limited to one or more of a physical keyboard, a function key (such as a volume control key and a power on/off key), a trackball, a mouse, and a joystick.

The NFC chip 340 includes an NFC controller (Near Field Communication Controller, NFCC) 341, and functions of the NFC controller include radio frequency signal modulation/demodulation and NFC protocol processing. The NFCC 341 is connected to a radio frequency antenna (that is, an NFC antenna) to send and receive NFC signals.

Optionally, to implement NFC payment, the mobile phone may further include a security element (security element, SE). The SE is configured to securely store sensitive information and provide a secure execution environment for a transaction. The SE may be integrated into the processor 350, may be located in a subscriber identification module (Subscriber Identification Module, SIM) card of the mobile phone, may be located in a secure digital memory card (Secure Digital Memory Card, SD) of the mobile phone, or may be an independent chip. The NFCC may be connected to the SE.

The display unit 370 may be configured to display information entered by the user, information provided for the user, and various menus of the mobile phone 300. The display unit 370 may include a display panel 371. Optionally, the display panel 371 may be configured in a form of a liquid crystal display (Liquid Crystal Display, LCD) or an organic light-emitting diode (Organic Light-Emitting Diode, OLED), or the like. Further, the touchscreen 331 may cover the display panel 371. After detecting a touch operation on or near the touchscreen 331, the touchscreen 331 transmits information about the touch operation to the processor 350 to determine a touch event type, and then the processor 350 provides corresponding visual output on the display panel 371 based on the touch event type. In FIG. 3, the touchscreen 331 and the display panel 371 are used as two independent components to implement input and output functions of the mobile phone 300. However, in some embodiments, the touchscreen 331 and the display panel 371 may be integrated to implement the input and output functions of the mobile phone 300.

The gravity sensor (gravity sensor) 380 may detect values of acceleration of the mobile phone in various directions (usually, there are three axes), may detect, in a static state, a value and a direction of gravity, and may be used for applications that recognize postures (for example, screen switching between a landscape mode and a portrait mode, a related game, and magnetometer posture calibration) of the mobile phone, vibration-recognition-related functions (for example, a pedometer and tapping), and the like.

The mobile phone 300 may further include another sensor such as a light sensor. Specifically, the light sensor may include an ambient light sensor and an optical proximity sensor. The ambient light sensor may adjust luminance of the display panel 331 based on brightness of ambient light. The optical proximity sensor may detect whether an object is approaching or touching the mobile phone, and may turn off the display panel 331 and/or backlight when the mobile phone 300 moves close to an ear. Other sensors that can be configured on the mobile phone 300 such as a gyroscope, a barometer, a hygrometer, a thermometer, and an infrared sensor are not detailed herein.

The audio circuit 390, a loudspeaker 391, and a microphone 392 may provide an audio interface between the user and the mobile phone 300. The audio circuit 390 may transmit, to the loudspeaker 391, an electrical signal that is converted from received audio data, and the loudspeaker 391 converts the electrical signal into a sound signal and outputs the sound signal. In addition, the microphone 392 converts a collected sound signal into an electrical signal; and the audio circuit 390 receives the electrical signal converts the electrical signal into audio data, and outputs the audio data to the RF circuit 310 so that the audio data is sent to, for example, another mobile phone, or the audio data is output to the memory 320 for further processing.

The processor 350 is a control center of the mobile phone 300, is connected to all the parts of the entire mobile phone by using various interfaces and lines, and performs various functions of the mobile phone 300 and processes data by running or executing the software program and/or module that are/is stored in the memory 320 and by invoking data stored in the memory 320, so as to perform overall monitoring on the mobile phone. Optionally, the processor 350 may include one or more processing units. Optionally, an application processor and a modem processor may be integrated into the processor 350. The application processor mainly processes an operating system, a user interface, an application, and the like, and the modem processor mainly processes wireless communication. It can be understood that the modem processor may alternatively not be integrated into the processor 350.

The mobile phone 300 further includes the power supply 360 (for example, a battery) that supplies power to all the components. Optionally, the power supply may be logically connected to the processor 350 by using a power management system, so that functions such as charging and discharging management and power consumption management are implemented by using the power management system.

Although not shown, the mobile phone 300 may further include an antenna, a Wireless Fidelity (Wireless-Fidelity, WiFi) module, a near field communication (Near Field Communication, NFC) module, a Bluetooth module, the loudspeaker, an accelerometer, the gyroscope, and the like.

Figure 4:
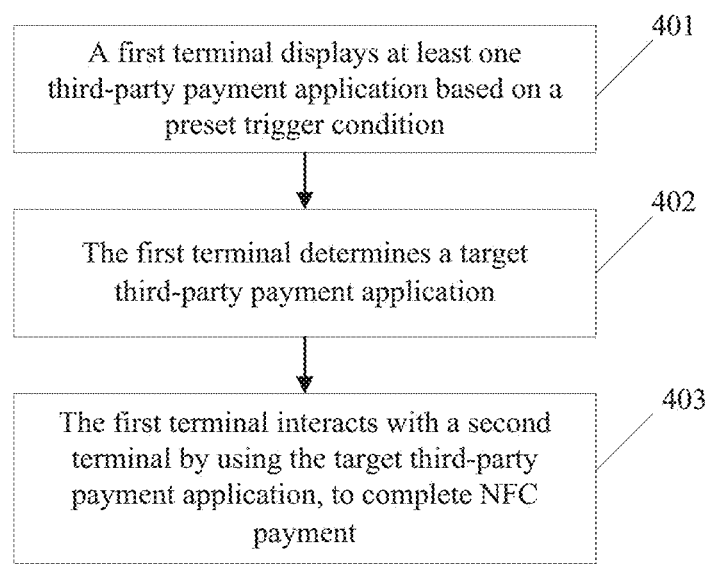
FIG. 4 is a schematic flowchart of an NFC payment method according to an embodiment of this application.

An embodiment of this application provides an NFC payment method that may be applied to the scenario shown in FIG. 2a or FIG. 2b. As shown in FIG. 4, the method includes the following steps.

401. A first terminal displays at least one third-party payment application based on a preset trigger condition.

402. The first terminal determines a target third-party payment application.

The target third-party payment application is one of the at least one third-party payment application.

403. The first terminal interacts with a second terminal by using the target third-party payment application, to complete NFC payment.

Optionally, in an implementation, from a user-visible perspective, the preset trigger condition includes that the first terminal comes into contact with the second terminal. Specifically, that the first terminal comes into contact with the second terminal means that a distance between the first terminal and the second terminal is within a communication range specified by the NFC protocol, and that the first terminal and the second terminal can perform NFC communication.

For the user, that the first terminal comes into contact with the second terminal is only a simple "contact" action that lasts for a rather short time. However, for the first terminal and the second terminal, an NFC interaction process is actually performed: The first terminal and the second terminal establish an NFC connection and perform radio frequency (Radio Fre) discovery, the first terminal receives an application selection instruction (select AID) sent by the second terminal, the first terminal responds based on the application selection instruction, and the like.

When the second terminal works in a reader/writer mode or a peer-to-peer mode, the second terminal may externally transmit an NFC signal to provide a radio frequency field. Therefore, optionally, in an implementation, "the first terminal comes into contact with the second terminal" is specifically that the first terminal detects the radio frequency field of the second terminal. Under the trigger condition, the first terminal displays an NFC payment-enabled application list. The application list displays the at least one third-party payment application including the target third-party payment application.

In actual application, the application displayed in the application list may be a default application that is set by the first terminal for NFC payment, or may be an application that is used to make NFC payment and that is set by the user on a setting screen of the first terminal. A sequence of applications in the application list may be set by the terminal by default, for example, a sequence in a provided selection list is the default sequence; or may be set by the user.

In this implementation, because the displayed application list includes a plurality of applications, before the first terminal interacts with the second terminal by using the target third-party payment application, to complete NFC payment, the first terminal receives an operation of the user for selecting a third-party payment application from the displayed at least one third-party payment application; uses, as the target third-party payment application, the third-party payment application selected by the user; and activates the target third-party payment application. Then, the first terminal interacts with the second terminal by using the target third-party payment application, to complete NFC payment. After the target third-party payment application is activated, the target third-party payment application or information related to the target third-party payment application can be discovered or selected by the second terminal. If the target third-party payment application as a card emulation application is discovered by the second terminal, activating the target third-party payment application means configuring an RF technical parameter or an RF protocol parameter related to the card emulation for an NFC chip. For a specific process, refer to the NFC protocol standard. If the target third-party payment application provides an NIT tag (Tag) for the second terminal, activating the target third-party payment application means configuring an RF technical parameter or an RF protocol parameter related to the NFC tag for an NFC chip. For a specific process, refer to the NFC protocol standard.

Optionally, in another implementation, "the first terminal comes into contact with the second terminal" is specifically that after the first terminal and the second terminal establish the NFC connection, the first terminal receives the application selection instruction sent by the second terminal. Because the application selection instruction carries an AID of an application used to make this NFC payment (this embodiment of this application is applied to a scenario in which a third-party payment application is used to make NFC payment, and therefore the application selection instruction carries the AID of the target third-party payment application), the application list displayed on the first terminal may include only the target third-party payment application. Optionally, when a screen of the first terminal displays only the target third-party payment application, the user may perform a confirmation operation again, to activate the target third-party payment application.

Certainly, in this implementation, to allow the user to select another application to restart this transaction, the another application may be displayed in addition to the target third-party payment application.

Optionally, the preset trigger condition further includes quick trigger manners performed by the user, such as pressing a preset physical button, entering preset fingerprint information, entering a specific voice instruction, entering a preset gesture, applying specific pressing force or making a specific gesture on a fingerprint sensor, performing facial recognition, scanning a specific icon, and detecting that the first terminal is in a specific location (for example, in a bank or a mall). When detecting any of the foregoing quick trigger manners, the first terminal displays the application list including the at least one third-party payment application.

Optionally, before the target third-party payment application is used to make NFC payment, the first terminal prompts the user to perform identity authentication; and after the user identity authentication succeeds, completes this NFC payment by using the target third-party payment application. A manner of prompting the user to perform identity authentication includes: displaying prompt information in a fingerprint recognition area to prompt the user to perform fingerprint recognition in the fingerprint recognition area; and after the fingerprint recognition succeeds, making NFC payment by using the target third-party payment application. The manner further includes: prompting the user to enter a password, prompting the user to enter a specific gesture, prompting the user to enter voice information, and the like.

Optionally, whether the first terminal performs user identity authentication is determined by the first terminal based on an amount of this transaction. When the transaction amount is relatively large and exceeds a given quota, the user is prompted to perform identity authentication. When the transaction amount is relatively small and is less than a given quota, there is no need to prompt the user to perform identity authentication. Certainly, whether the user is required to perform identity authentication may alternatively be determined based on information such as a time and a location of this transaction. For example, a method such as big data analytics is used in advance to obtain, through statistics collection, a time range or a location range within which the user usually makes transaction, the time range is set as a secure time range, and the location range is set as a secure location range, in this case, if the current transaction time is within the secure time range or the current location is within the secure location range, the user is not required to perform identity authentication. Otherwise, the user is prompted to perform identity authentication.

Optionally, after the first terminal interacts, by using the target third-party payment application, with the second terminal and completes NFC payment, the first terminal informs the user that the NFC payment has been completed. The prompting manner may be displaying information, such as prompt information and a payment amount, on the first terminal. The prompting may be performed by using an SMS message, or in another manner such as a voice or vibration manner. The prompting manner is not limited in this embodiment of this application.

It should be noted that the first terminal does not need to display the application list in the following cases. These cases include at least: When the user only sets a specific third-party payment application as a default payment application, the first terminal may directly determine the specific third-party payment application as the target third-party payment application after detecting the preset trigger condition, and does not display the application list. Alternatively, after detecting the preset trigger condition, the first terminal directly determines, as the target third-party payment application, an application with a highest priority or used most frequently by the user.

According to the NFC payment method provided in this embodiment of this application, the first terminal and the second terminal can use the third-party payment application to make NFC payment. In comparison with the prior art that a third-party payment application can be used to make payment only by scanning a quick response code, in the NFC payment method provided in this embodiment of this application, the user only needs to perform a contact operation to use the third-party payment application to make payment. This can reduce user operations and increase a speed for making payment by using the third-party payment application.

To describe the method provided in this embodiment of this application more clearly, the method provided in this embodiment of this application is specifically described with reference to the application scenario shown in FIG. 2a.

Figure 5:
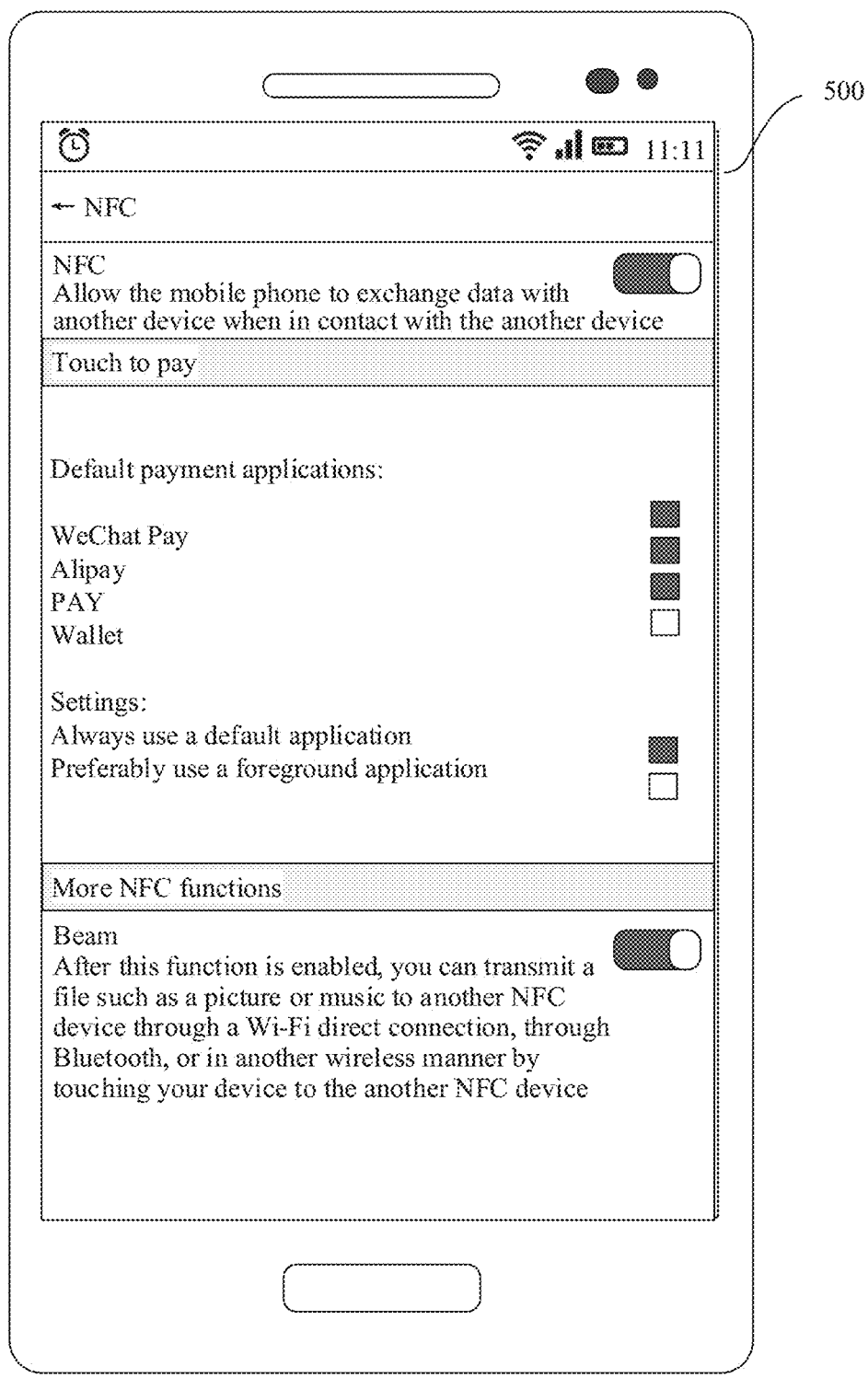
FIG. 5 is a schematic diagram of an NFC function setting screen of a mobile phone.

For example, referring to FIG. 5, a user performs setting on a setting screen 500 of a mobile phone 100, and sets "WeChat Pay", "Alipay", and "PAY" applications as default applications for the first terminal to make NFC payment.

"WeChat Pay" and "Alipay" are third-party payment applications mentioned in this embodiment of this application. "PAY" is a factory-set application in the first terminal, may be an application that has been preconfigured by a mobile phone manufacturer or referred to as a system-native application, and can carry a card emulation application supporting NFC payment such as an application for a bank card or a bus pass, for example, an HCE application. In another implementation, the HCE application may alternatively not be carried in a specific system-native application of the mobile phone, and is directly installed by the user in the mobile phone. For a specific implementation of making NFC payment by using the HCE application, refer to the prior art. Details are not described herein.

Figure 5A:
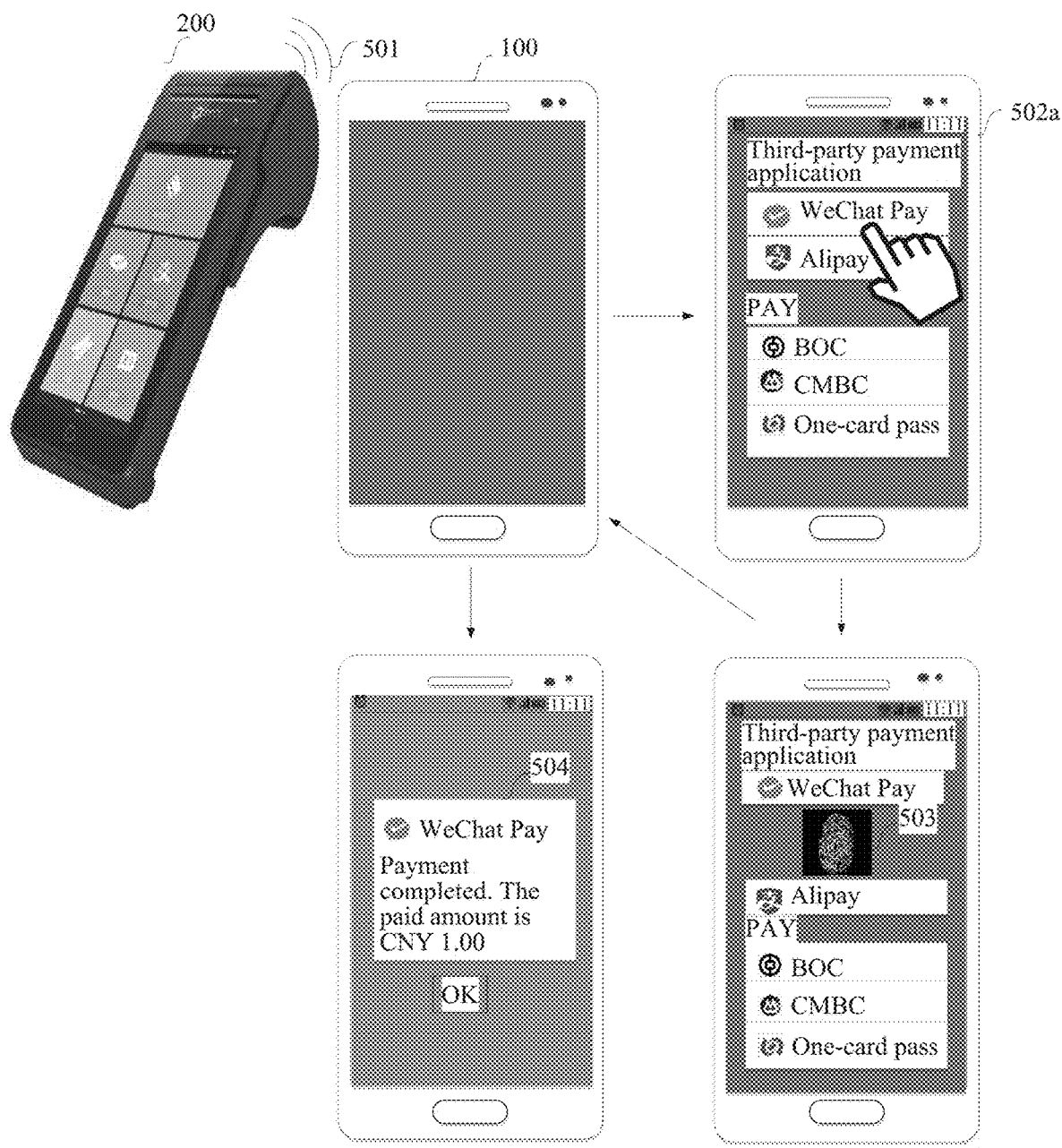
FIG. 5a is a schematic process diagram of an NFC payment method according to an embodiment of this application.

Referring to FIG. 5a, when a mobile phone 100 approaches a POS terminal 200 (as shown in a procedure 501 in FIG. 5a), the mobile phone 100 displays a screen 502a; the screen 502a displays a list of applications available for NFC payment on the mobile phone 100; and the application list displays two third-party payment applications: "WeChat Pay" and "Alipay", and NFC payment-enabled card applications installed in "PAY" such as "BOC", "CMBC", and "One-card Pass", After receiving a selection operation of a user for selecting "WeChat Pay" from the application list displayed on the screen 502a, the mobile phone displays a screen 503. The screen 503 displays fingerprint authentication information, prompting the user to perform fingerprint authentication. After the fingerprint authentication succeeds, the mobile phone 100 determines WeChat Pay as the target third-party payment application. The mobile phone 100 and the POS terminal 200 use WeChat Pay to complete this NFC payment, and a screen 504 is displayed after WeChat Pay ends. The screen 504 displays prompt information informing the user that the payment has been completed by using WeChat Pay, and displays related information such as a payment amount. Certainly, the screen 502a may alternatively be skipped. After the user performs identity authentication on the screen 503, it is considered that the user has completed a selection operation. On the screen 503, the user may alternatively switch an application by tapping another application icon or the like.

Figure 5B:
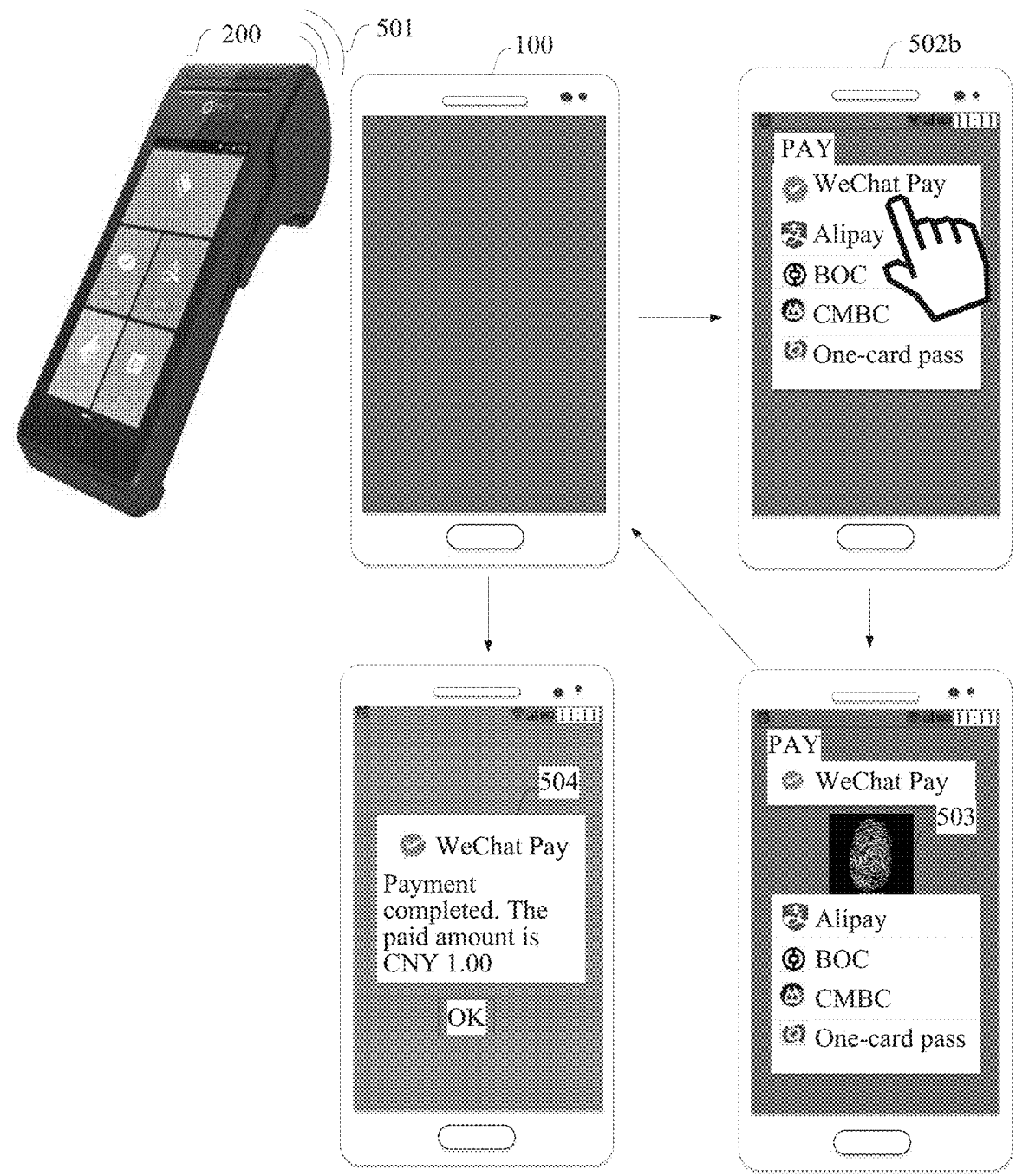
FIG. 5b is a schematic process diagram of another NFC payment method according to an embodiment of this application.

Optionally, "WeChat Pay" may alternatively be used as a payment application added to "PAY", and it may be understood that third-party payment applications, such as WeChat Pay, are bound to "PAY". Therefore, the third-party payment applications bound to "PAY" can be considered as special card applications, and are similar to other bank card applications bound to "PAY". In this case, FIG. 5b shows another form of the screen 502a. When the mobile phone 100 comes into contact with the POS terminal 200, the mobile phone 100 displays a screen 502b; and the screen 502b displays all applications displayed in "PAY", including "BOC", "CMBC", "One-card Pass", "WeChat Pay", and "Alipay".

Figure 6:
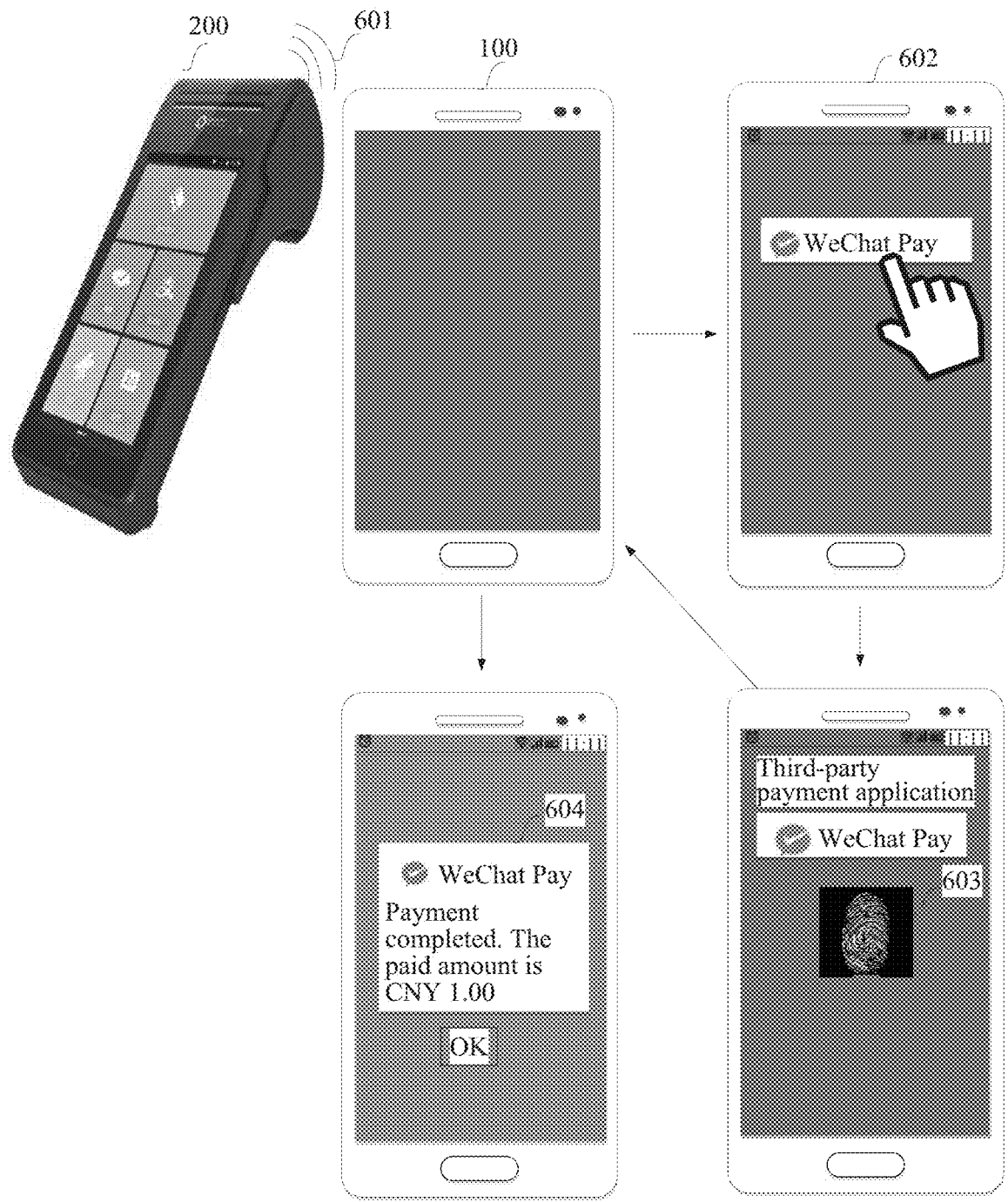
FIG. 6, FIG. 7, and FIG. 8 are schematic process diagrams of NFC payment methods according to an embodiment of this application.

For example, referring to FIG. 6, when a mobile phone 100 comes into contact with a POS terminal 200 (as shown in a procedure 601 in FIG. 6), the mobile phone 100 displays a screen 602, and an application list displayed on the screen 602 includes only WeChat Pay. A possible reason is: When the mobile phone 100 comes into contact with the POS terminal 200, the POS terminal 200 sends a select AID instruction to the mobile phone 100 and the select AID instruction carries an AID of WeChat Pay. Another possible reason is: Only WeChat Pay is set as a default application in the mobile phone 100, or the mobile phone 100 automatically selects WeChat Pay based on conditions such as priorities or use frequencies of applications. After the mobile phone 100 receives a confirmation operation performed by a user on the screen 602, the mobile phone displays a screen 603, prompting the user to perform fingerprint authentication. After the fingerprint authentication succeeds, the mobile phone 100 and the POS terminal 200 use WeChat Pay to complete this NFC payment, and a screen 604 is displayed after WeChat Pay ends. The screen 604 displays prompt information informing the user that WeChat Pay has been completed, and displays a payment amount.

It should be noted that the fingerprint authentication operation in FIG. 5a, FIG. 5b, and FIG. 6 may be performed when the mobile phone approaches the POS terminal. Alternatively, the fingerprint authentication operation may be performed after the mobile phone moves away from the POS terminal; in this case, after the user completes the fingerprint authentication, the mobile phone needs to approach the POS terminal again to make NFC payment. To ensure that an NFC payment process is not interrupted when NFC payment is made in a manner of "approaching the POS terminal twice by the mobile phone", a possible implementation is: When the mobile phone approaches the POS terminal for the first time or after the mobile phone moves away from the POS terminal, the mobile phone records the operation of the user for selecting WeChat Pay as the target third-party payment application. Therefore, when the mobile phone approaches the POS terminal again, the mobile phone activates WeChat Pay and may proceed with a subsequent process. If an identity authentication operation is further performed after WeChat Pay is selected, after the identity authentication succeeds, the mobile phone keeps the successful authentication result valid for a specific period of time. Therefore, if the mobile phone approaches the POS terminal again within the period of time, the target third-party payment application may be directly used to complete this NFC payment, without having to perform identity authentication again.

Figure 7:
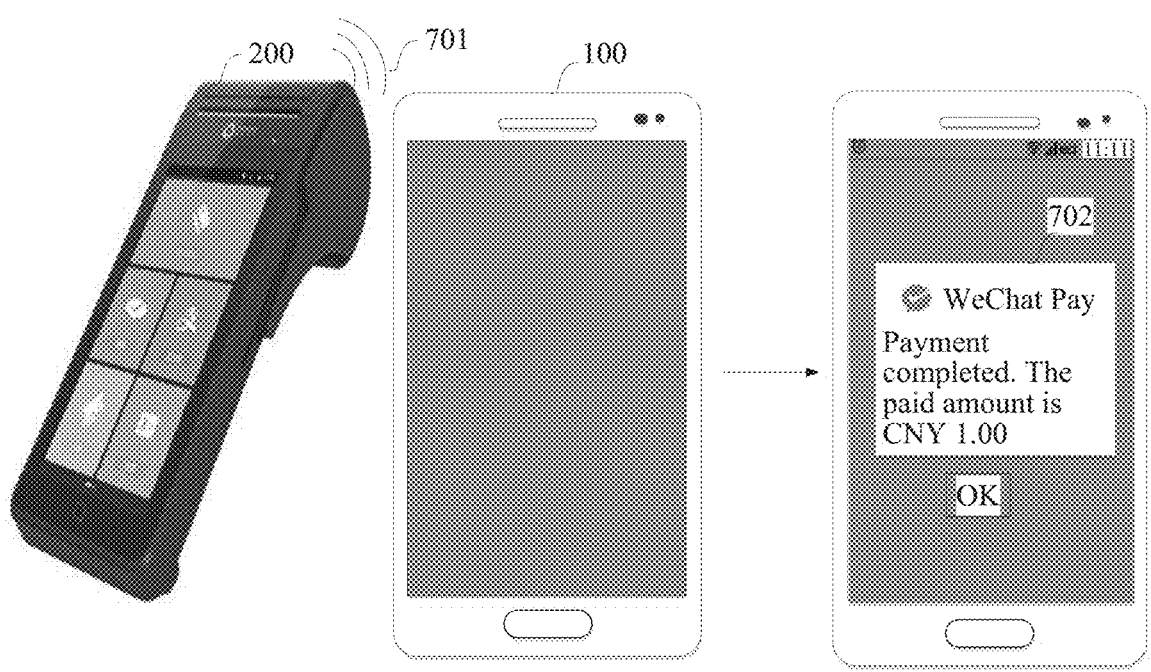

Referring to FIG. 7, in another implementation, when a transaction amount is relatively small (for example, is less than a preset quota) and a mobile phone 100 comes into contact with a POS terminal 200 (as shown in a procedure 701 in FIG. 7), a user is not required to perform identity authentication; instead, the mobile phone 100 and the POS terminal 200 directly use WeChat Pay to complete NFC payment, and a prompt screen 702 is displayed after the NFC payment is completed, to inform the user that WeChat Pay has been completed and to display information such as a payment amount.

Figure 8:
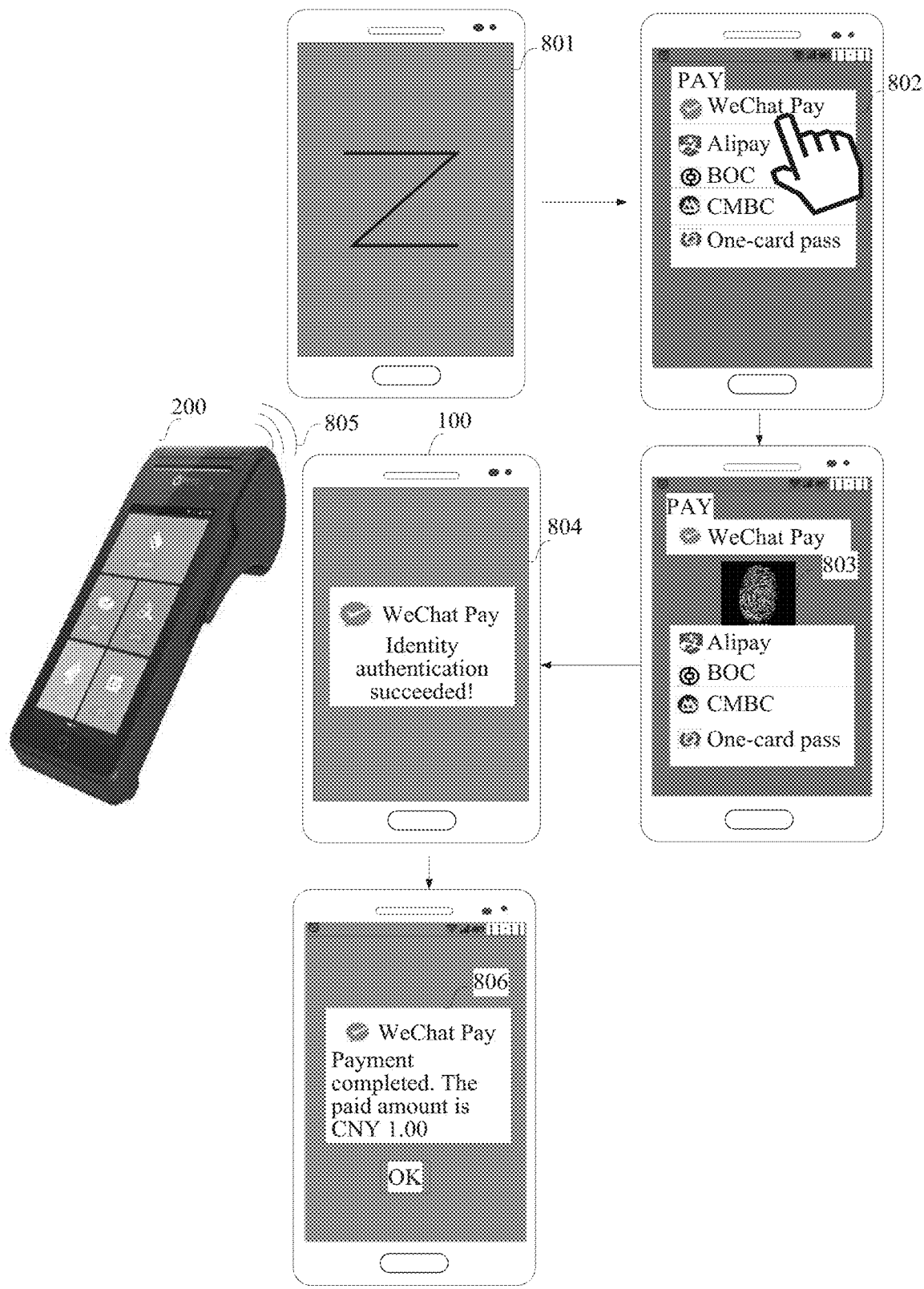

Referring to FIG. 8, in another implementation, after a user enters a preset gesture on a locked screen of a mobile phone 100 (as shown in a procedure 801 in FIG. 8), the mobile phone 100 displays a screen 802. The screen 802 displays a list of applications available for NFC payment on the mobile phone 100; and the application list displays third-party payment applications such as "WeChat Pay" and "Alipay", and NFC payment-enabled card applications in "PAY" such as "BOC", "CMBC", and "One-card Pass". After receiving a selection operation of the user for selecting "WeChat Pay" on the screen 802, the mobile phone 100 displays a screen 803. The screen 803 displays fingerprint authentication information, prompting the user to perform fingerprint authentication. After the fingerprint authentication succeeds, the mobile phone displays a screen 804. The screen 804 displays prompt information informing the user that the identity authentication succeeds. After the mobile phone 100 comes into contact with a POS terminal 200 (as shown in a procedure 805 in FIG. 8), the mobile phone 100 and the POS terminal 200 use WeChat Pay to complete this NFC payment, and a screen 806 is displayed after WeChat Pay ends. The screen 806 displays prompt information informing the user that WeChat Pay has been completed, and displays a payment amount.

The methods shown in FIG. 4, FIG. 5a, FIG. 6, FIG. 7, and FIG. 8 may be applied to a scenario in which the first terminal has been unlocked, or may be applied to a scenario in which the first terminal is in a locked state, for example, a scenario in which the first terminal is screen-locked or screen-off. When the method in this embodiment of this application is applied to a screen-locked or screen-off scenario, a step of unlocking the first terminal by the user can be further omitted, further reducing user operations and implementing fast payment.

To implement the processes shown in FIG. 4, FIG. 5a, FIG. 6, FIG. 7, and FIG. 8, in an implementation, the target third-party payment application registers a specific type of HCE service in the first terminal, and then the first terminal interacts with the second terminal based on the specific type of HCE service, to complete NFC payment by using the target third-party payment application.

The specific type of HCE service mentioned in this embodiment of this application is distinguished from a prior-art HCE service registered by an HCE application such as a bank card application. When the first terminal not only includes a third-party payment application, but also includes HCE applications for bank cards of China Merchants Bank, Bank of China, and the like, a bank card application registers the HCE service defined in the prior art, and a third-party payment application registers the specific type of HCE service during installation. Therefore, the third-party payment application may be considered as a special type of HCE application.

In addition, the specific type of HCE service in this embodiment of this application is applied to a process in which when the AID carried in the application selection instruction (for example, a SELECT command defined in ISO/IEC 7816-4) is the AID of the target third-party payment application, the application selection instruction is parsed, a response is made, and subsequent NFC payment is made by using a preset protocol, for example, a process in which the first terminal sends payment information of the target third-party payment application to the second terminal. The preset protocol herein may be defined by a system developer of the first terminal. In this case, the specific type of HCE service is equivalent to an interface specially provided by the system developer for various third-party payment applications. Certainly, the preset protocol may alternatively be defined in another manner, for example, cooperatively defined by one or more third-party payment applications and the system developer.

In an implementation, the specific type of HCE service may be an independent service specially provided by a system of the first terminal for third-party payment applications. In other words, the third-party payment applications may separately call an interface corresponding to the service, to implement NFC payment.

Figure 9A:
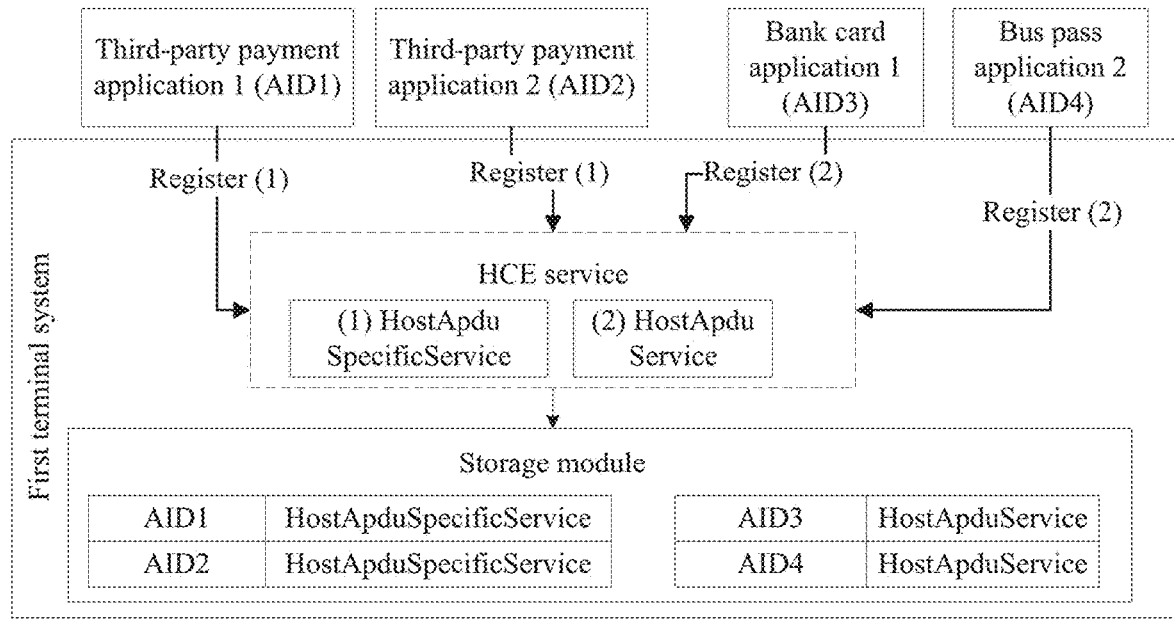
FIG. 9a and FIG. 9b are schematic diagrams of implementation processes in which a third-party payment application registers an I-ICE service according to an embodiment of this application.

Specifically, referring to FIG. 9a, in an implementation, the first terminal extends an HCE service type, for example, adds a service type: HostApduSpecificService. In this case, representation information that is carried in registration information of an HCE application such as a bank card application and that is used to represent an HCE service type is HostApduService, and representation information that is carried in registration information of a third-party payment application and that is used to represent an HCE service type is HostApduSpecificService. In another implementation, a current HCE service type HostApduService is modified to HostApduCommonService, indicating a current HCE service type corresponding to an HCE application such as a bank card application. The specific type of HCE service mentioned in this embodiment of this application is represented as HostApduSpecificService, indicating a specific HCE, service type. In this case, representation information that is carried in registration information of an HCE application such as a bank card application and that is used to represent an HCE service type is HostApduCommonService, and representation information that is carried in a third-party payment application and that is used to represent an HCE service type is HostApduSpecificService. The first terminal stores a correspondence between an AID of each application and representation information of an HCE service type.

In the foregoing manner, the first terminal stores the correspondence between the AID of each application and the HCE service type. Further, after an AID of an application is obtained, an HCE service type corresponding to the AID is determined based on the stored HCE service type corresponding to the AID.

In the foregoing manner, it is equivalent to that the system of the first terminal provides an upper-layer application with two service interfaces corresponding to the specific type of HCE service and a common type of HCE service. The specific type of HCE service is applicable to an application provided by a third-party payment service provider, such as WeChat Pay, that is, an application that registers the specific type of HCE service is a third-party payment application such as WeChat Pay. An existing HCE service or a modified common HCE, service is applicable to a card application issued by an institution such as a bank, that is, an application that registers the common HCE service is an existing common card application, such as a bank card or a membership card.

In another implementation, the specific type of HCE service may be a service extended based on an existing HCE service. To be specific, a third-party payment application calls an interface corresponding to the existing HCE service; and based on the application identifier carried in the application selection instruction sent by the second terminal, an application type, or the like, the HCE service determines whether an object to be called for this NFC payment is a third-party payment application; and when the object to be called is a third-party payment application, uses the new function extended from the HCE service for processing.

Figure 9B:
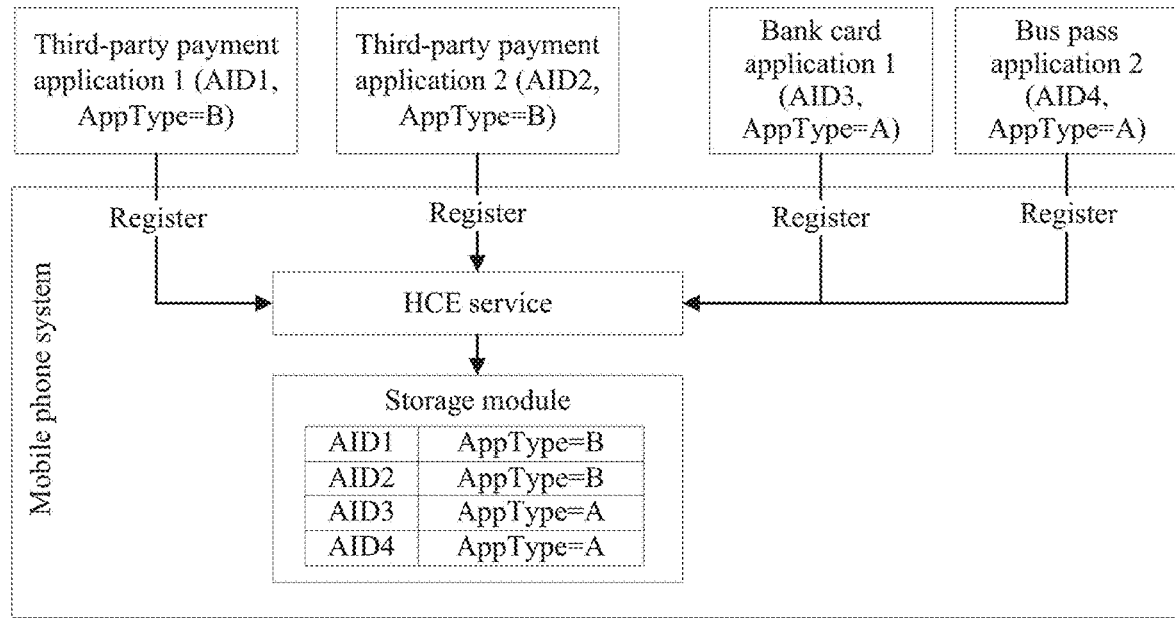

Specifically, the existing HCE service is modified and enhanced, for example, a capability of identifying an application type is added to the existing HCE service. In this case, for a third-party payment application, an application type parameter (App Type Param) may be added to a configuration file for registration with the first terminal, where the application type parameter is used to identify an HCE service type. Specifically, when a value of the parameter is a first value, it indicates that an application that registers the HCE service is an existing common card application, such as a bank card or a membership card; when a value of the parameter is a second value, it indicates that an application that registers the ME service is a third-party payment application such as WeChat Pay. The first terminal stores a correspondence between an AID of an application and an application type parameter. Referring to FIG. 9b, an AID of a third-party payment application 1 is AID1 and an AppType value corresponding to the third-party payment application 1 is B; and an AID of a third-party payment application 2 is AID2 and an AppType value corresponding to the third-party payment application 2 is also B. This indicates that HCE service types corresponding to the third-party payment application 1 and the third-party payment application 2 are a same HCE service type. The HCE service type is specifically the specific HCE service type mentioned in this embodiment of this application. An AID of a bank card 1 is AID3 and an AppType value corresponding to AID3 is A; and an AID of a bus pass application 2 is AID4 and an AppType value corresponding to AID4 is A. This indicates that HCE service types corresponding to the bank card 1 and the bus pass application 2 are a same HCE service type. The HCE service type is specifically an existing HCE service type.

In this implementation, the first terminal stores a correspondence between an AID of an application and AppType. Therefore, after obtaining an AID of an application, the first terminal determines, based on the stored AppType value corresponding to the AID, an HCE service type corresponding to the AppType value.

In the implementation in FIG. 9b, it is equivalent to that the system of the first terminal provides an upper-layer application with one interface corresponding to an HCE service, but the HCE service is corresponding to two processing branches. If an application type parameter is a third-party payment application, processing logic of the HCE service is processing logic of step 901 to step 909 described in the embodiments of this application. If an application type is an existing IC card application such as a bank card application, processing logic of the HCE service complies with an existing card technology procedure (for example, a procedure defined by a PBOC or an EMVCo). Details are not described herein.

In conclusion, in all of the foregoing possible implementations, an HCE service registered by a third-party payment application may be referred to as the specific type of HCE service, no matter it is a newly added independent service in FIG. 9a or an extended service that is obtained after the existing HCE service is modified and enhanced in FIG. 9b.

Figure 10A:
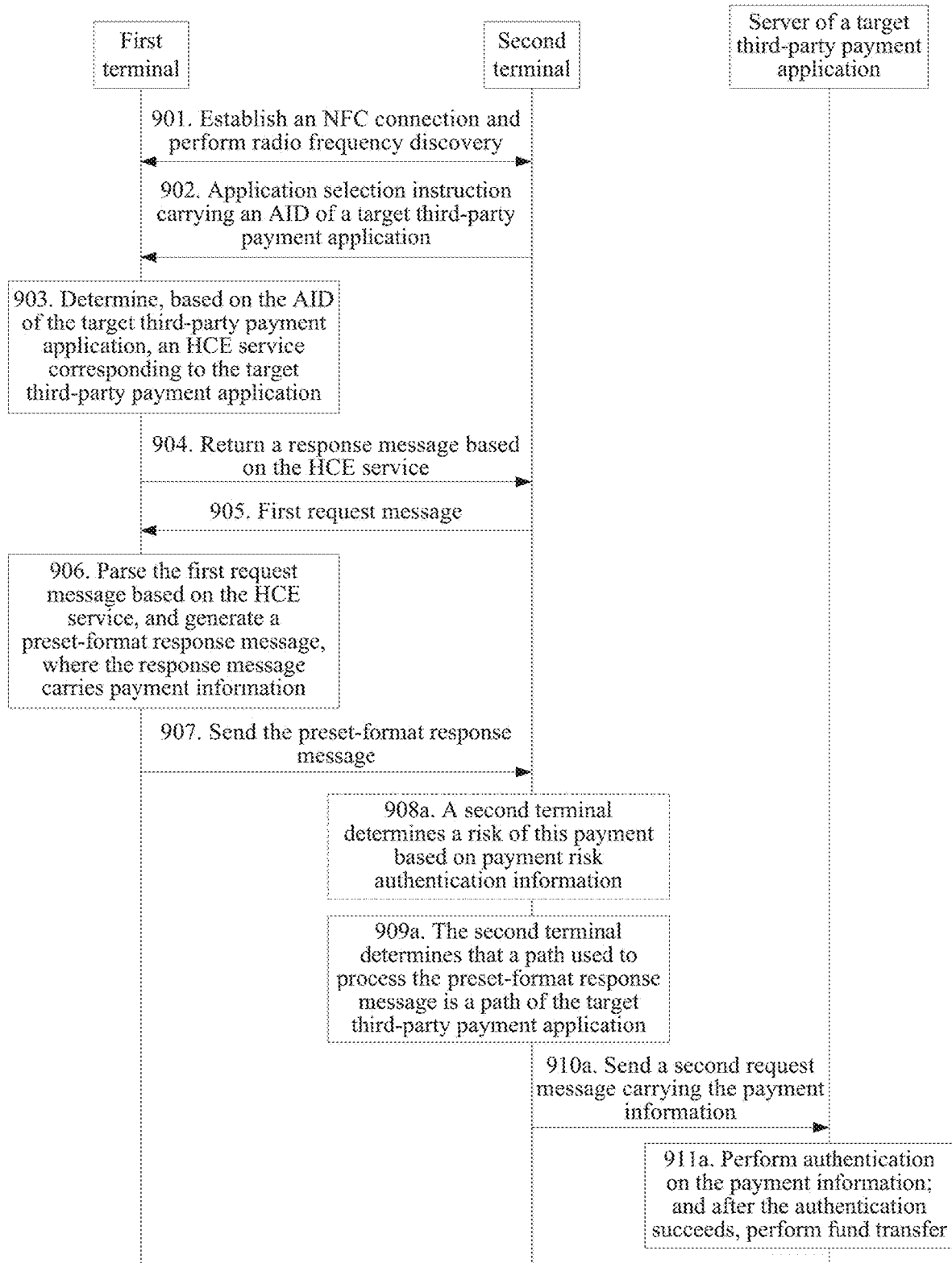

In this way, when the first terminal receives the application selection instruction that carries the AID of the target third-party payment application and that is sent by the second terminal, the first terminal can determine, based on the AID carried in the application selection instruction, that an application used to make this NFC payment is the target third-party payment application. In this case, the first terminal determines to parse the application selection instruction based on the specific type of HCE service corresponding to the target third-party payment application, and sends a response message to the second terminal. Specifically, as shown in FIG. 10a, the process includes the following steps.

901. A first terminal and a second terminal establish an NFC connection, and the first terminal and the second terminal perform a radio frequency discovery process.

For a specific implementation of this step, refer to the prior art. Details are not described herein.

902. The first terminal receives an application selection instruction sent by the second terminal.

The application selection instruction carries an AID of the target third-party payment application.

It should be noted that the AID of the target third-party payment application is registered by the target third-party payment application from a system when the target third-party payment application is being installed in the first terminal, and may need to be applied for from a specific institution by a developer of the application in advance, so as to specially identify this type of application.

903. The first terminal determines, based on the AID of the target third-party payment application, an HCE service corresponding to the target third-party payment application.

Optionally, in an implementation, the first terminal stores a correspondence between the AID of the target third-party payment application and a service type; and the first terminal determines, based on the prestored correspondence, the I-ICE service corresponding to the AID of the target third-party payment application.

The first terminal stores registration information of the target third-party payment application, where the registration information includes the AID of the target third-party payment application and representation information of the service type, and the registration information is used to determine the correspondence between the AID of the target third-party payment application and the service type.

Specifically, as shown in FIG. 9a or FIG. 9b, the target third-party payment application needs to register a specific type of HCE service in the system when the target third-party payment application is being installed in the first terminal. When the specific type of HCE service is being registered, the target third-party payment application needs to declare some registration information to the system of the first terminal (for example, declaration and registration are performed by using a manifest configuration file in an Android system). Such registration information may include the AID of the target third-party payment application and the representation information of the HCE service type. The first terminal may determine the HCE service type of the target third-party payment application based on the representation information of the HCE service type, and further determine and store the correspondence between the AID of the target third-party payment application and the HCE service type. The representation information of the HCE service type herein is information specially used to identify the HCE service type. Referring to FIG. 9a, the information specially used to identify the HCE service type is a newly added HCE service for a third-party payment application, for example, HostApduSpecificService; or the information specially used to identify the HCE service type is information specially used to identify a payment application type. Referring to FIG. 9b, the information specially used to identify the HCE service type is App Type Param.

Optionally, in an implementation, the first terminal determines, based on a registered AID of an application, an HCE service registered by the application. For example, a number of an AID that a third-party payment application requests to register is a number within a preset range. When the number of the AID is a number within the preset range, the first terminal determines a registered HCE service of the application as a specific type of HCE service. When the number of the AID is another number, the first terminal determines a registered HCE service of the application as a common type of HCE service.

Optionally, in another implementation, after receiving the application selection instruction, the first terminal sends the application selection instruction to a server of the target third-party payment application. The server of the target third-party payment application determines, based on the AID carried in the application selection instruction, the EWE service type corresponding to the target third-party payment application, and informs the first terminal of the HCE service type used to parse the application selection instruction; and the first terminal determines the HCE service based on the HCE service type.

904. The first terminal returns a response message to the second terminal based on the HCE service determined in step 903.

The response message includes an application selection response generated by the first terminal, for example, a SELECT response defined in the ISO/IEC 7816 protocol. The application selection response is used to inform the first terminal that application selection succeeds.

In this step, the first terminal parses the application selection instruction based on the determined HCE service, and sends the response message to the second terminal.

After the first terminal returns the application selection response to the second terminal, the second terminal sends a request message to the first terminal to obtain payment information of the first terminal.

905. The first terminal receives, based on the HCE service determined in step 903, a first request message sent by the second terminal.

The first request message is used to obtain payment information of the target third-party payment application, where the payment information is specifically payment making information used by the first terminal to make payment. The first request message is a preset-format message specified by a preset protocol. The preset protocol may be specially formulated for transmitting payment information of a third-party payment application, or may be a protocol defined by an NFC standard organization, for example, an NFC data exchange format (NFC Data Exchange Format, NDEF) protocol.

The specific type of HCE service in this embodiment of this application can be used to receive and process the preset-format message specified by the preset protocol.

Therefore, in this step, the first terminal receives the first request message based on the specific type of HCE service.

906. The first terminal parses the first request message based on the HCE service determined in step 903, and generates a preset-format response message.

In a specific implementation of this step, after parsing the first request message based on the HCE service determined in step 903, the first terminal encapsulates the generated payment information of the target third-party payment application into the preset-format response message.

The generated payment information of the target third-party payment application may be one-off payment information that is generated by the first terminal offline. Specifically, the payment information may be one-off payment information of the target third-party payment application that is generated by the first terminal based on an account of the target third-party payment application and other information such as a possible amount and time of this transaction and a pre-downloaded key seed by using a specific algorithm. Alternatively, the payment information may be one-off payment information that is generated online by the server of the target third-party payment application, and is sent by the server to the first terminal. One-off payment information that is generated each time NFC payment is made by using the target third-party payment application may vary with a transaction amount, a location, or a moment of each payment. Alternatively, the payment information may be fixed payment information of the target third-party payment application that is generated based on an account of the target third-party payment application. In other words, payment information of the target third-party payment application that is generated each time the target third-party payment application is used to make payment is the fixed payment information.

Optionally, the preset-format response message generated in step 906 further includes payment risk authentication information, where the payment risk authentication information is information used to determine a payment risk. For example, the payment risk authentication information may be location information of the first terminal.

907. The first terminal sends the preset-format response message to the second terminal based on the HCE service determined in step 903.

Optionally, before sending the preset-format response message, the first terminal performs security processing on information carried in the preset-format response message, such as the payment information and the payment risk authentication information. Alternatively, the first terminal may perform security processing only on some information in the preset-format response message, such as the payment risk authentication information. For example, this embodiment of this application provides the following two security processing manners.

Manner 1: The first terminal calculates a digest (for example, calculates a hash value) for the information carried in the preset-format response information, and encrypts the calculated digest by using a private key of the target third-party payment application, to obtain a signature. Then, the first terminal encapsulates the foregoing information and the signature into the preset-format response message, and may also encapsulate a public key certificate of the target third-party payment application into the preset-format response message. Certainly, the first terminal may alternatively encrypt the foregoing information and the signature by using a public key of the second terminal or a symmetric key negotiated by the two terminals, encapsulate the encrypted foregoing information and signature into the response message, and send the response message to the second terminal.

Manner 2: The first terminal encrypts the foregoing information by using a public key of the server or a symmetric key negotiated with the server, and encapsulates the encrypted information into the preset-format response message. For a specific implementation process of the encryption, refer to the prior art. Details are not described herein. Certainly, the first terminal may alternatively perform signature processing on the information in the response message before the encryption operation, for example, encrypt a hash value of the information by using a private key corresponding to the first terminal, so as to perform encryption and encapsulation on both the signature and the information for sending.

Optionally, in some cases, for example, when an amount of the current transaction is relatively large (for example, is greater than a preset threshold), the second terminal performs the following step 908a to determine a payment risk; or after receiving the preset-format response message sent by the first terminal, the second terminal performs the following step 908a by default, to determine a payment risk.

908a. The second terminal determines a risk for this payment based on payment risk authentication information.

Optionally, the payment risk authentication information is carried in the preset-format response message in step 907. Alternatively, the second terminal requests the payment risk authentication information from the server of the target third-party payment application, to obtain the payment risk authentication information from the server. The server of the target third-party payment application generates and stores the payment risk authentication information when generating the payment information of the first terminal.

When a determining result is that this payment is not risky, the second terminal performs the following step 909a. When a determining result is that this payment is risky, the second terminal ends this NFC payment, or sends inquiry information to the first terminal, where the inquiry information is used to inform the first terminal that this payment is risky. After receiving the inquiry information, the first terminal informs a user that this NFC payment is risky and asks the user whether to continue this NFC payment, and the first terminal sends a response message to the second terminal based on user selection, to end or continue this NFC payment. Certainly, if a user of the second terminal is a payer, a risk prompt message may be directly displayed to the user of the second terminal, and a subsequent process continues to be performed after the user agrees.

For example, if the payment risk authentication information is the location information of the first terminal, a process in which the second terminal determines a risk for this payment based on the location information is specifically: The second terminal determines whether a distance between a location of the first terminal and a current location of the second terminal is less than a threshold, and if the distance is less than the threshold, considers that the first terminal "approaches" the second terminal and this payment is not risky; otherwise, the second terminal considers that this payment is risky.

Optionally, when the information carried in the preset-format response message is information on which security processing has been performed, the second terminal performs authentication on the information on which security processing has been performed, and performs step 908a after the authentication succeeds. For example, in the security processing manner 1, the second terminal performs authentication on the signature in the response message by using a private key of the second terminal. If the information in the response message has been encrypted by using the public key of the second terminal or the symmetric key negotiated by the two terminals, the second terminal first needs to use the private key of the second terminal or the symmetric key negotiated by the two terminals to decrypt the information in the response message.

909a. After receiving the preset-format response message, the second terminal determines that a path used to process the preset-format response message is a path of the target third-party payment application.

In a specific implementation of this step, when the preset-format response message includes the AID of the target third-party payment application, the second terminal determines, based on the AID, that the path used to process the preset-format response message is the path of the target third-party payment application. In other words, the second terminal establishes a connection to the server of the target third-party payment application. When the preset-format response message does not include the AID of the target third-party payment application, the second terminal determines, based on the target third-party payment application selected in a SELECT command sending process and a response process in step 902 to step 904, that the path used to process the preset-format response message is the path of the target third-party payment application.

It should be noted that currently, a terminal such as a POS machine supports only a non-third-party payment application such as a bank card application. However, in this embodiment of this application, the second terminal may be a POS machine supporting only a third-party payment application, or may be a POS machine supporting both an existing non-third-party payment application such as a bank card application and a third-party payment application such as WeChat Pay. In this case, based on whether a payment application corresponding to received payment information is a third-party payment application or a non-third-party payment application, the second terminal determines to select a server corresponding to a third-party payment application or a server corresponding to a non-third-party payment application (for example, a settlement server of UnionPay, a server of a bank, or a settlement server of Visa), for payment settlement.

It should also be noted that step 909a may alternatively be performed before 908a. To be specific, after it is determined that the path used to process the preset-format response message is the path of the target third-party payment application, the second terminal determines a payment risk. When determining that there is no payment risk, the second terminal performs the following step 910a; when determining that there is a payment risk, the second terminal automatically ends this NFC payment, or ends or continues this NFC payment based on a user operation. In addition, because in this embodiment, whether a selected payment application is a third-party payment application can be determined in the application selection process in steps 902 to 904, step 909a may be performed following step 904.

910a. The second terminal sends a second request message to a server of the target third-party payment application.

The second request message carries the payment information sent by the first terminal. The second request message is used to request the server of the target third-party payment application to perform authorization on this transaction, that is, request the server to perform authentication on the payment information. If the authentication performed by the server on the payment information succeeds, this transaction can be authorized. To be specific, an amount of this transaction is directly deducted from a corresponding payer's account and the amount of this transaction is added to a payee's account; or a financial institution, such as a bank, corresponding to a bank card bound to a third-party payment application is requested to perform fund transfer.

Optionally, when the response message returned by the first terminal to the second terminal further carries the payment risk authentication information, the second request message may further carry the payment risk authentication information or a determining result obtained based on the payment risk authentication information.

In addition, the server of the target third-party payment application determines the payer's account information based on the payment information. To help the server determine the payee's account information, when sending the second request message, the second terminal may further send the payee's account information, an identifier of the second terminal, or other information that helps the server find the payee's account, to the server of the target third-party payment application.

911a. The server of the target third-party payment application performs payment authentication based on payment information; and after the authentication succeeds, performs fund transfer.

After the server of the target third-party payment application receives the second request message, the server performs authentication based on the payment information because the second request message carries the payment information of the first terminal.

Referring to step 906, the payment information of the first terminal may be one-off payment information generated by the first terminal, may be one-off payment information generated by the server, or may be fixed payment information that is generated by the user of the first terminal based on the registered account of the target third-party payment application.

For the payment information generated by the first terminal, in a manner, the server may generate payment information by using a same preset algorithm, and compare this payment information with the payment information sent by the second terminal, to determine whether the payment information is valid. For the payment information generated by the server, in a manner, the server may obtain prestored payment information based on the account of the target third-party payment application of the first terminal, an account identifier, an identifier of the first terminal, or the like, and directly compare the obtained payment information that is prestored in the server with the payment information carried in the second request message, to determine whether the payment information is valid.

Moreover, fund transfer herein may be transfer of a fund from an account of the target third-party payment application of a payer. For example, a fund is transferred from payer's account that is separately provided and operated by a third-party payment service provider, such as Balances of WeChat Pay or Balances of Alipay. Alternatively, a fund is transferred from a bank card bound to the target third-party payment application of the payer to an account of the target third-party payment application of a payee or a bank card of the payee bound to the third-party payment application.

Optionally, when a payment amount is relatively large, the server of the target third-party payment application sends an identity authentication notification message to the first terminal, for example, delivers an authentication code, or requests to enter a payment password or a fingerprint. After the identity authentication succeeds, the server of the target third-party payment application performs fund transfer.

Figure 10B:
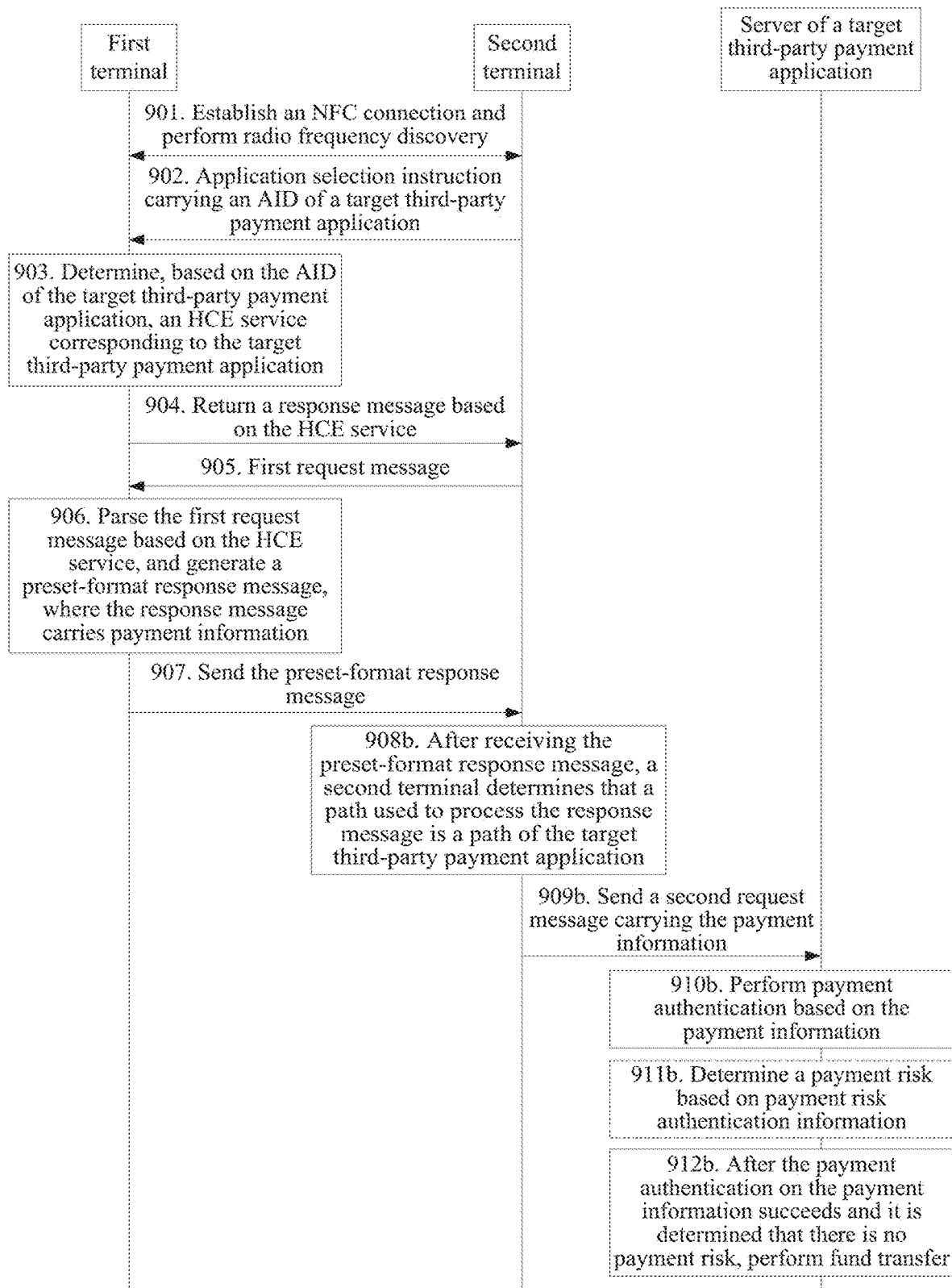

Optionally, as an alternative solution of step 908a to step 911a, an embodiment of this application further provides a payment risk determining method. As shown in FIG. 10b, the method includes the following steps.

908b. After receiving the preset-format response message, the second terminal determines that a path used to process the preset-format response message is a path of the target third-party payment application.

This step is similar to 908a, and details are not described herein again.

909b. The second terminal sends a second request message to a server of the target third-party payment application.

For details of this step, refer to step 910a. Details are not described herein again. A difference between step 910a and step 909b lies in: In the implementation shown in FIG. 10a, the second terminal determines a payment risk, and therefore the second request message in step 910a may include a payment risk authentication result. In contrast, in this implementation process, the second terminal does not need to determine a payment risk, and the server of the target third-party payment application determines a payment risk instead. Therefore, the second request message in step 909b may include payment risk authentication information instead of a payment risk determining result. A possible reason is: The payment risk authentication information carried in the response message in step 907 may be information that has been processed in the security processing manner 2. Therefore, only the server of the target third-party payment application can perform security undoing processing (for example, decryption processing) to obtain the payment risk authentication information.

910b. The server of the target third-party payment application performs payment authentication based on the payment information.

In this step, the server performs authentication on the payment information in a manner similar to that in step 911a. Details are not described herein again.

911b. The server of the target third-party payment application determines a payment risk based on payment risk authentication information.

It should be noted that the payment risk authentication information in this step may be carried in the second request message, or the payment risk authentication information is determined by the server of the target third-party payment application based on the payment information in the second request message after the second request message is received. Specifically, an account of the target third-party payment application is determined based on the payment information, and then the payment risk authentication information that is set by the user corresponding to the account when the user registers the account is determined, for example, a secure location range or a secure time range. Alternatively, the payment risk authentication information may be corresponding payment risk authentication information that is obtained when the server of the target third-party payment application determines to generate the payment information for the target third-party payment application of the first terminal based on the payment information in the second request message after the server receives the second request message.

The process in which the server of the target third-party payment application determines a payment risk based on the payment risk authentication information specifically includes: For example, the server compares a location of the first terminal with a location of the second terminal, and if a distance between the two terminals is less than a threshold, considers that there is no payment risk for this transaction; otherwise, considers that there is a payment risk. The location of the second terminal may be carried in the second request message when the second terminal submits the second request message. For another example, the server compares the location of the first terminal with the secure transaction location range that is set by the user of the first terminal, and if the location is within the secure transaction location range, considers that there is no payment risk for this transaction; otherwise, considers that there is a payment risk.

Optionally, when the message that is carried in the second request message and that is used to determine a payment risk is an encrypted message, the second terminal performs decryption. After the decryption succeeds, step 910b is performed.

912b. After payment authentication on the payment information succeeds and it is determined that there is no payment risk, the server of the target third-party payment application performs fund transfer.

Fund transfer in this step is similar to that in step 911a, and details are not described herein again.

Figure 1B:

Optionally, as an alternative solution of step 908a to step 911a, an embodiment of this application further provides a payment risk determining method. As shown in FIG. 10c1 and FIG. 10c2, the method includes the following steps.

908c. After receiving the preset-format response message, the second terminal determines that a path used to process the response message is a path of the target third-party payment application.

For details of this step, refer to step 908b. Details are not described herein again.

909c. The second terminal sends a second request message to a server of the target third-party payment application.

The second request message carries the payment information sent by the first terminal. The second request message is used to request the server of the target third-party payment application to perform authorization on this transaction, that is, request the server to perform authentication on the payment information.

910c. The server of the target third-party payment application performs payment authentication based on the payment information.

The following step 911c is performed after the payment authentication succeeds.

911c. The server of the target third-party payment application sends a response message to the second terminal, where the response message is used to prompt the second terminal to perform identity authentication.

After receiving the response message sent by the server of the target third-party payment application, the second terminal performs the following step 912c to determine a payment risk, and performs identity authentication after determining that there is not payment risk.

912c. The second terminal determines a payment risk based on payment risk determining information.

When determining that this payment is risky, the second terminal ends this procedure. When determining that this payment is not risky, the second terminal performs the following step 913.

913. The second terminal performs user identity authentication.

An identity authentication manner includes authenticating a fingerprint, entering a specific password, entering a specific authentication code, and the like. After the first terminal performs user identity authentication, the second terminal performs the following step 914 to send an identity authentication result to the server of the target third-party payment application.

914. The second terminal sends an identity authentication result to the server of the target third-party payment application.

915. The server of the target third-party payment application performs fund transfer based on the identity authentication result after the identity authentication succeeds.

Fund transfer in this step is similar to that in step 911a, and details are not described herein again.

Optionally, as an alternative solution of step 914 and step 915, the second terminal obtains user identity authentication information, and sends, to the server of the target third-party payment application, the identity authentication information such as a fingerprint and a password entered by the user, so that the server of the target third-party payment application performs identity authentication based on the identity authentication information.

After successfully performing identity authentication or receiving the identity authentication result that indicates an identity authentication success and that is sent by the second terminal, the server of the target third-party payment application performs step 915.

To support the implementation processes in FIG. 4, FIG. 5a, FIG. 6, FIG. 7, and FIG. 8, an embodiment of this application further provides an NFC payment method. In the method, a first terminal stores payment information of the first terminal into an NFC tag, and a second terminal can read the NFC tag to obtain the payment information of the first terminal. The method may be applied to a scenario in which the first terminal is a payee and the second terminal is a payer. In this scenario, the first terminal serving as a payee's terminal stores the payment information of the first terminal (that is, payment receiving information) into the NFC tag, and the second terminal serving as a payer's terminal can read the NFC tag to obtain the payment receiving information of the first terminal. Alternatively, the method may be applied to a scenario in which the first terminal is a payer and the second terminal is a payee. In this scenario, the first terminal serving as a payer's terminal stores the payment information of the first terminal (that is, payment making information) into the NFC tag, and the second terminal serving as a payee's terminal can read the NFC tag to obtain the payment making information of the first terminal.

Figure 11A:
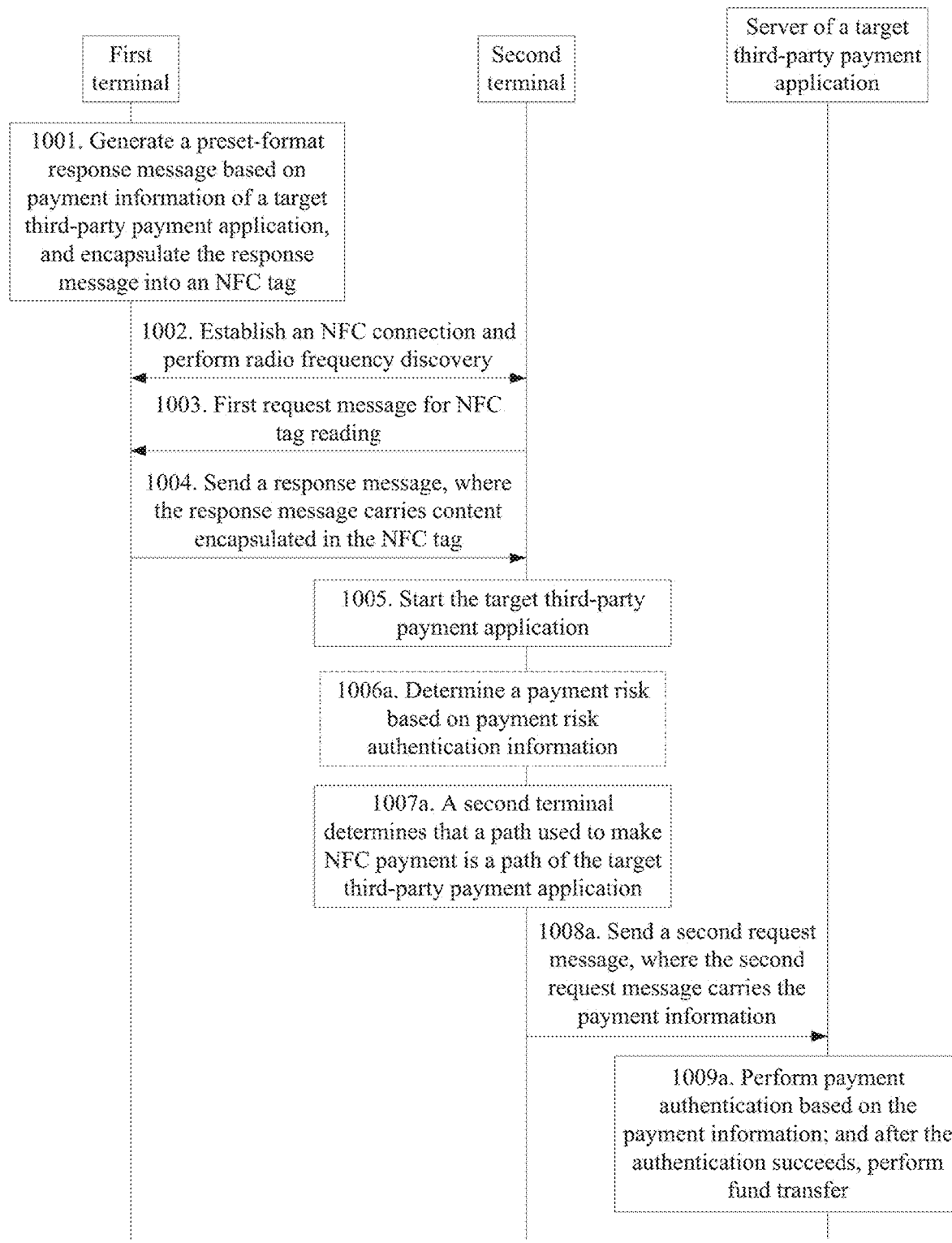

As shown in FIG. 11a, the method includes the following steps.

1001. A first terminal generates a preset-format response message based on payment information of the target third-party payment application, and encapsulates the preset-format response message into an NFC tag.

For details about generation of the payment information, refer to step 906. Details are not described herein again.

When the first terminal is a payer's terminal and the second terminal is a payee's terminal, the payment information of the target third-party payment application is payment making information of the target third-party payment application. When the first terminal is a payee's terminal and the second terminal is a payer's terminal, the payment information of the target third-party payment application is payment receiving information of the target third-party payment application.

Optionally, the preset-format response message may be an NDEF message.

Optionally, after determining the target third-party payment application as an application for this NFC payment and activating the target third-party payment application, the first terminal may encapsulate the preset-format response message into the NFC tag. Specifically, a trigger condition for triggering the first terminal to generate the NFC tag includes: The first terminal detects a quick operation of a user, where the quick operation includes pressing a preset physical button, entering preset fingerprint information, entering a specific voice instruction, entering a preset gesture, or the like performed by the user. The trigger condition further includes: The first terminal detects a radio frequency field of the second terminal.

Optionally, in another implementation, before the first terminal establishes an NFC connection to the second terminal to make NFC payment, the first terminal may encapsulate, in the first terminal, the payment information of the target third-party payment application into the NDEF message, and store the NDEF message to the NFC tag.

Optionally, the preset-format response message may further carry other information such as payment risk authentication information, a response message function type, and an identifier of the target third-party payment application.

The payment risk authentication information may be location information. The function type is registered by the target third-party payment application from a system when the target third-party payment application is being installed in the second terminal, and is used to indicate that a target function of the target third-party payment application is capable of processing a message carrying the function type. The function type includes a payment receiving type, a payment making type, and the like. A specific manner of registering, by the target third-party payment application, the function type in the system may be: The target third-party payment application registers corresponding function types for a payment receiving function and a payment making function of the target third-party payment application in the system. For example, in a manifest configuration file of an Android system, a supported function type registered for a corresponding payment receiving function activity (activity) is a payment receiving type, and a supported function type registered for a corresponding payment making function activity (activity) is a payment making type. In this embodiment of this application, when the first terminal is a payer's terminal and the second terminal is a payee's terminal, the function type is the payment making type. When the first terminal is a payee's terminal and the second terminal is a payer's terminal, the function type is the payment receiving type.

In another implementation, the function type is used to instruct the second terminal to perform a target function indicated by the function type. For example, if the function type carried in the response message sent by the first terminal is "payment receiving", the second terminal performs the payment receiving function after receiving the response message. Likewise, if the function type carried in the response message sent by the first terminal is "payment making", the second terminal performs the payment making function after receiving the response message.

The identifier of the target third-party payment application may be an application package name of the target third-party payment application, and the identifier may be transmitted based on an independent record, that is, an application record (Android Application Record, AAR) used in a tag dispatch (Tag Dispatch) mechanism defined by the existing Android system. Certainly, the identifier may alternatively be transmitted in another manner. For example, the identifier is placed together with other information into a payload (payload) of an AAR in the response message.

1002. The first terminal and a second terminal establish an NFC connection and perform a radio frequency discovery process.

During the radio frequency discovery process in this step, the second terminal may detect whether the first terminal supports an NFC tag protocol. In other words, the second terminal may detect whether the first terminal has an NFC tag. Once an NFC tag is detected, the following step 1003 is performed to continue processing.

1003. The first terminal receives a request message for NFC tag reading sent by the second terminal.

This step may be performed between step 1001 and step 1002, or may be performed after step 1001 and step 1002.

Because the first terminal encapsulates the payment making information of the first terminal and other possible information into the NFC tag, the second terminal sends the request message to the first terminal, where the request message is used to read the NFC tag generated by the first terminal. The request message herein may be a read command defined in the NFC tag protocol. Details are not described herein.

1004. The first terminal sends a response message to the second terminal, where the response message carries content encapsulated in the NFC tag.

The response message herein may be a read response corresponding to the read command defined in the NFC tag protocol. Details are not described herein.

1005. The second terminal starts the target third-party payment application.

Specifically, when information carried in the NFC tag includes the identifier of the target third-party payment application, the second terminal directly determines, based on the identifier, to forward the information to the target third-party payment application corresponding to the identifier for processing; and then starts the target third-party payment application. When information carried in the NFC tag does not include the identifier of the target third-party payment application, the second terminal starts the target third-party payment application based on a user operation, for example, the user has selected the target third-party payment application on the second terminal before the first terminal comes into contact with the second terminal. Alternatively, when being installed in the second terminal, a plurality of applications have registered an NFC tag processing capability from the system. In this case, after reading the NFC tag, the system of the second terminal displays all applications that have been installed in the second terminal and that are capable of processing the NFC tag, to the user for selection.

Optionally, after the target third-party payment application is started, when the information carried in the NFC tag further includes the response message function type, for example, when the function type is "payment making", the second terminal determines that an action to be performed by the first terminal is "payment making". Correspondingly, an action to be performed by the second terminal is "payment receiving", and therefore the second terminal directly displays a payment receiving screen of the target third-party payment application. It can be understood that the information in the NFC tag is directly forwarded to a corresponding function of the target third-party payment application for processing. Alternatively, when the function type is "payment receiving", the second terminal determines that an action to be performed by the first terminal is "payment receiving". Correspondingly, an action to be performed by the second terminal is "payment making", and therefore the second terminal directly displays a payment making screen of the target third-party payment application.

Optionally, when the NFC tag further carries the payment risk authentication information used to determine a payment risk, the second terminal performs the following step 1006a to determine a payment risk.

1006a. The second terminal determines a payment risk based on payment risk authentication information.

When a payment risk determining result is that there is no payment risk, the following step 1007a is performed. When a payment risk determining result is that there is a payment risk, the second terminal ends this NFC payment, or sends inquiry information to the first terminal, where the inquiry information is used to inform the first terminal that this payment is risky. After receiving the inquiry information, the first terminal informs the user that this NFC payment is risky and asks the user whether to continue this NFC payment, and the first terminal sends a response message to the second terminal based on user selection, to end or continue this NFC payment. For a specific implementation of this step, refer to step 908a. Details are not described herein again.

It should be noted that when the NFC tag does not include the payment risk authentication information, the second terminal may skip step 1006a and directly perform the following step 1007a. Alternatively, the second terminal requests the payment risk authentication information of the first terminal from a server of the target third-party payment application, and performs step 1006a based on location information obtained from the server, to determine a risk for this payment.

1007a. The second terminal determines that a path used to make NFC payment is a path of the target third-party payment application.

It should be noted that step 1007a may be performed before or after step 1006a. An execution sequence of step 1006a and step 1007a is not limited in this embodiment of this application. When the second terminal performs step 1007a before performing step 1006a to determine a payment risk, the second terminal performs the following 1008a only when determining that there is no payment risk. Alternatively, step 1007a may be performed by default after step 1005. In other words, when determining that this NFC payment is to be made by using the target third-party payment application, the second terminal may determine that the path to be used for this transaction is the path of the target third-party payment application, that is, the second terminal is to establish a communication connection to the server of the target third-party payment application.

For a specific implementation of this step, refer to step 909a. Details are not described herein again.

1008a. The second terminal sends a second request message to a server of the target third-party payment application.

For a specific implementation of this step, refer to step 910a. Details are not described herein again.

1009a. The server of the target third-party payment application performs authentication based on the payment information; and after the authentication succeeds, performs fund transfer.

Optionally, when a payment amount is relatively large, the server of the target third-party payment application sends identity authentication information to the first terminal, for example, delivers an authentication code, or enters a payment password or a fingerprint. After the identity authentication succeeds, the server of the target third-party payment application performs fund transfer.

For a specific implementation of this step, refer to step 911a. Details are not described herein again.

Figure 11B:
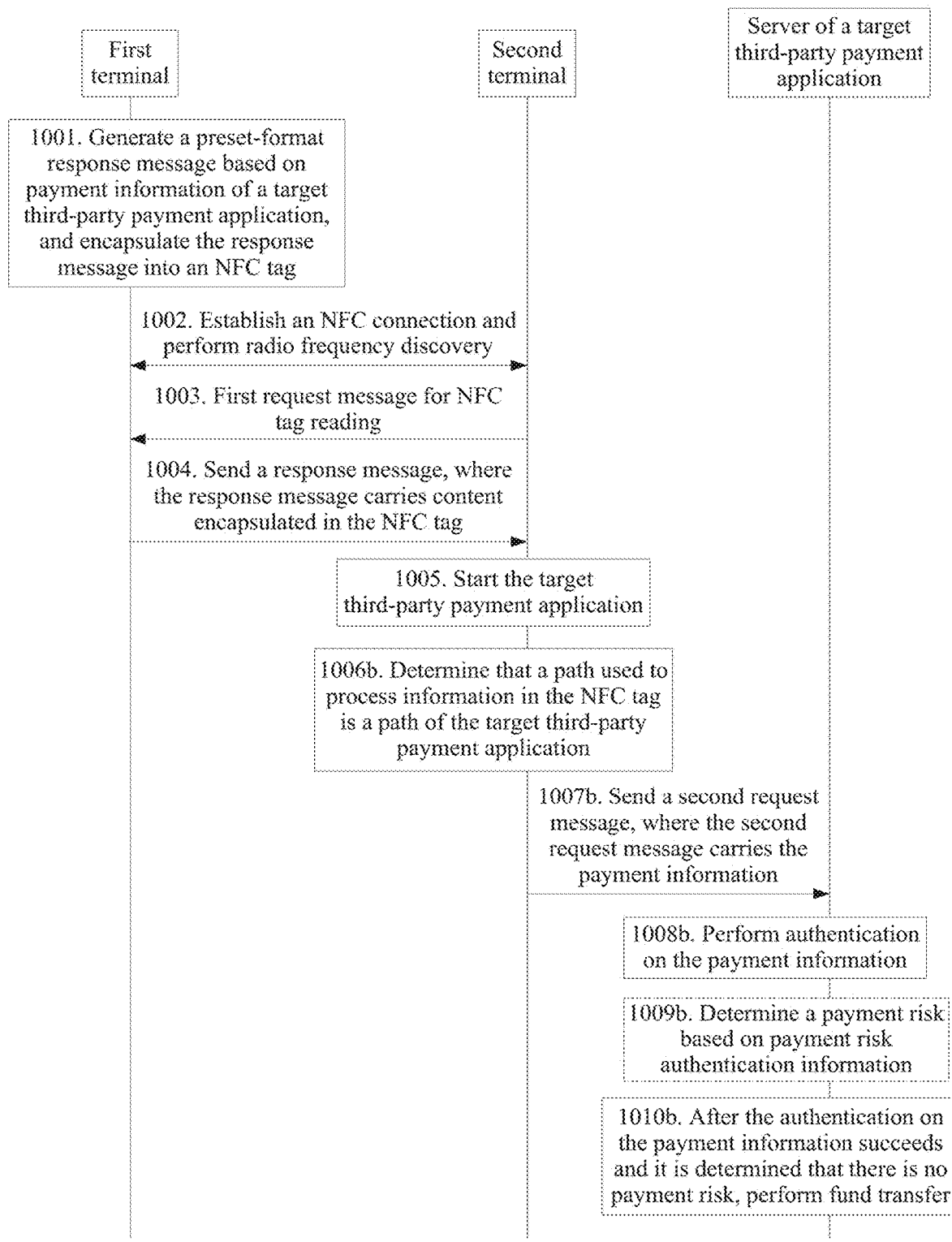

Optionally, as an alternative solution of step 1006a to step 1009a, an embodiment of this application further provides a payment risk determining method. As shown in FIG. 11b, the method includes the following steps.

1006b. The second terminal determines that a path used to process information in the NFC tag is a path of the target third-party payment application.

For a specific implementation of this step, refer to step 909a. Details are not described herein again.

1007b. The second terminal sends a second request message to a server of the target third-party payment application.

For a specific implementation of this step, refer to step 909b. Details are not described herein again.

1008b. The server of the target third-party payment application performs authentication on the payment information.

For details of this step, refer to step 911a. Details are not described herein again.

1009b. The server of the target third-party payment application determines a payment risk based on payment risk authentication information.

Optionally, the second request message carries the payment risk authentication information. In a specific implementation of this step, the server of the target third-party payment application determines a payment risk based on the payment risk authentication information carried in the second request message.

Optionally, when generating the payment making information of the target third-party payment application, the server of the target third-party payment application stores the payment risk authentication information, in a specific implementation of this step, the server of the target third-party payment application determines a payment risk based on the prestored payment risk authentication information.

For details of this step, refer to step 911b, Details are not described herein again.

1010b. After the authentication on the payment information succeeds and it is determined that there is no payment risk, perform fund transfer.

Optionally, when a payment amount is relatively large, the server of the target third-party payment application sends identity authentication information to the first terminal, for example, enters an authentication code or enters a fingerprint. After the identity authentication succeeds, the server of the target third-party payment application performs fund transfer.

For details of this step, refer to step 912b. Details are not described herein again.

Optionally, as an alternative solution of step 1006a to step 1009a, an embodiment of this application further provides a payment risk determining method. The method is mainly applied to a scenario in which the first terminal is a payee's terminal and the second terminal is a payer's terminal.

Figure 11C:
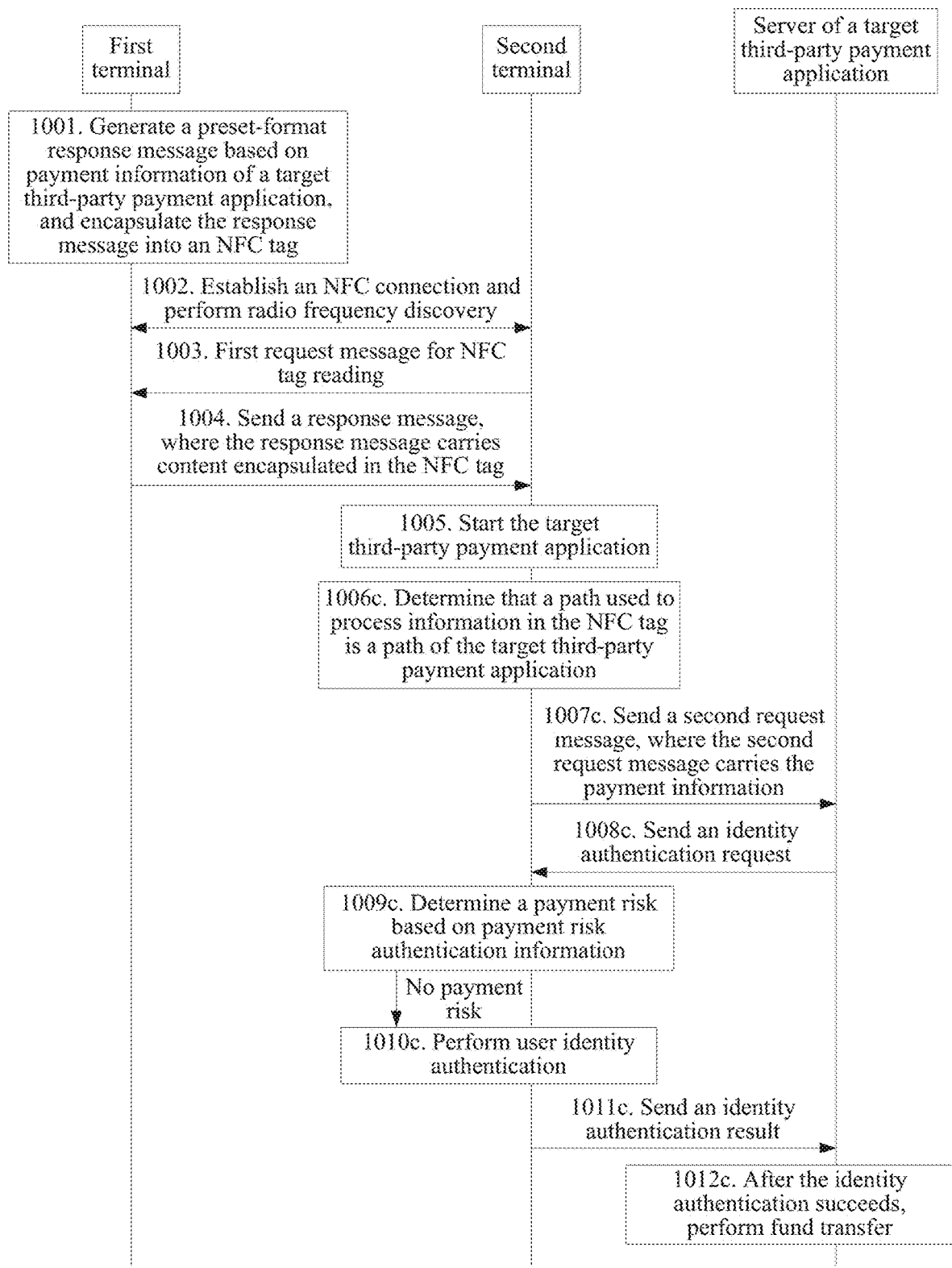

As shown in FIG. 11c, the method includes the following steps.

1006c. The second terminal determines that a path used to process information in the NFC tag is a path of the target third-party payment application.

1007c. The second terminal sends a second request message to a server of the target third-party payment application.

The second request message carries the payment information sent by the first terminal, for example, the payment receiving information of the first terminal. The second request is used to request the server of the target third-party payment application to perform authorization on this transaction. The server of the target third-party payment application may further determine the payee's account based on the payment information sent by the first terminal.

In addition, to help the server of the target third-party payment application determine the payee's account, the second terminal may further send related information of the user of the second terminal to the server, for example, an account registered by the user of the second terminal in the target third-party payment application or other information that can be associated with the account of the user of the second terminal, so that the server determines the account used to make payment in this transaction.

Optionally, after receiving the second request message sent by the second terminal, the server of the target third-party payment application performs step 1008c, to request the user to perform identity authentication.

1008c. The server of the target third-party payment application sends an identity authentication request to the second terminal.

The server may directly determine, after receiving the second request message, that the user of the second terminal is required to perform identity authentication; or determine, based on a specific situation (for example, an amount of this transaction exceeds a threshold), that the user of the second terminal is required to perform identity authentication. Then, the server may send the identity authentication request to the second terminal, to prompt the user of the second terminal to perform identity authentication.

1009c. The second terminal determines a payment risk based on payment risk authentication information.

After receiving the identity authentication request sent by the server, the second terminal may perform determining based on the payment risk authentication information, to determine whether to prompt the user to perform identity authentication. If considering that there is no payment risk, the second terminal performs the following step 1010c, to request the user to perform identity authentication.

The payment risk authentication information is carried in the response message sent in step 1004, or the payment risk authentication information is obtained by the second terminal from the server of the target third-party payment application.

When a payment risk determining result is that there is a payment risk, the second terminal ends this NFC payment, or displays prompt information, where the prompt information is used to inform the user that this payment is risky and ask the user whether to continue this NFC payment, and the second terminal ends or continues this NFC payment based on user selection.

1010c. The second terminal performs user identity authentication when determining that there is no payment risk.

An identity authentication manner includes authenticating a fingerprint, entering a specific password, entering a specific authentication code, and the like. After the first terminal performs user identity authentication, the second terminal performs the following step 1011c to send an identity authentication result to the server of the target third-party payment application.

1011c. The second terminal sends an identity authentication result to the server of the target third-party payment application.

When the identity authentication succeeds, the second terminal may send a result of the success to the server of the target third-party payment application. When the identity authentication fails, the second terminal may send a result of the failure to the server, or may directly end the procedure and does not send the result to the server.

1012*c*. After the user identity authentication succeeds, the server of the target third-party payment application performs fund transfer.

For a specific implementation of fund transfer in this step, refer to step 911*a*. Details are not described herein again.

Optionally, as an alternative solution of step 1010*c* and step 1011*c*, the second terminal obtains user identity authentication information, and sends, to the server of the target third-party payment application, the identity authentication information such as a fingerprint and a password entered by the user, so that the server of the target third-party payment application performs identity authentication based on the identity authentication information.

After successfully performing identity authentication or receiving the identity authentication result that indicates an identity authentication success and that is sent by the second terminal, the server of the target third-party payment application performs step 1012*c*.

The foregoing mainly describes the solutions provided in the embodiments of this application from a perspective of interaction between network elements. It can be understood that to implement the foregoing functions, network elements, such as the first terminal, the second terminal, and the server of the target third-party payment application, include corresponding hardware structures and/or software modules for performing the functions. A person skilled in the art should be easily aware that units and algorithm steps in the examples described with reference to the embodiments disclosed in this specification may be implemented in a form of hardware or a combination of hardware and computer software in this application. Whether the functions are performed by hardware or computer software driving hardware depends on particular applications and design constraints of the technical solutions. A person skilled in the art may use a different method to implement the described functions for each particular application, but it should not be considered that the implementation goes beyond the scope of this application.

In the embodiments of this application, functional modules of the first terminal and the second terminal may be divided based on the foregoing method example. For example, each functional module may be obtained through division in correspondence to each function, or at least two functions may be integrated into one processing module. The integrated module may be implemented in a form of hardware, or may be implemented in a form of a software functional module. It should be noted that the module division in the embodiments of this application is an example, and is merely logical function division. There may be another division manner in actual implementation.

Figure 12A:
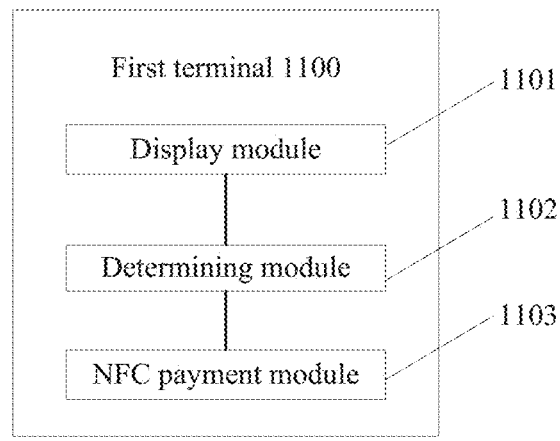
FIG. 12a, FIG. 12b, FIG. 12c, and FIG. 12d are schematic structural diagrams of first terminals according to an embodiment of this application.

When each functional module is obtained through division in correspondence to each function, FIG. 12*a* is a possible schematic structural diagram of a first terminal according to an embodiment. A first terminal 1100 includes a display module 1101, a determining module 1102, and an NFC payment module 1103. The display module 1101 is configured to support the first terminal 1100 in performing the procedure 401 in FIG. 4, The determining module 1102 is configured to support the first terminal 1100 in performing the procedure 402 in FIG. 4. The NFC payment module 1103 is configured to support the first terminal 1100 in performing the procedure 403 in FIG. 4, and the procedures 901, 902, 903, 904, 905, 906, and 907 in FIG. 10*a*, FIG. 10*b*, and FIG. 10*c*1; and is further configured to support the first terminal 1100 in performing the procedures 1001, 1002, 1003, and 1004 in FIG. 11*a*, FIG. 11*b*, and FIG. 11*c*.

All related content of various steps in the foregoing method embodiments may be cited in function descriptions of a corresponding functional module. Details are not described herein again.

Figure 12B:
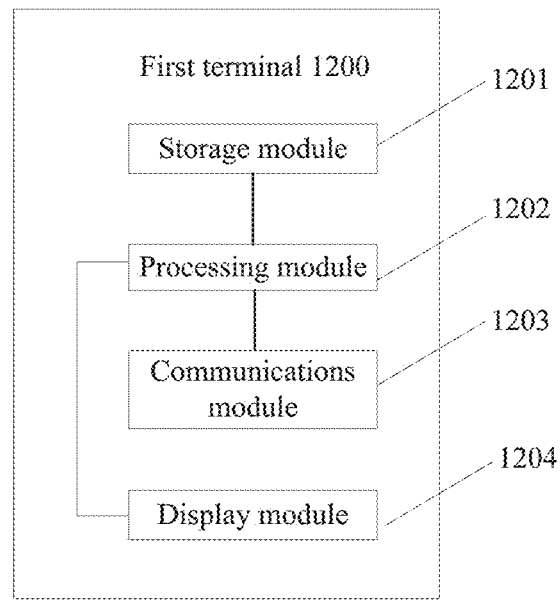

When an integrated unit is used, FIG. 12*b* is a possible schematic structural diagram of a first terminal according to an embodiment. A first terminal 1200 includes a processing module 1202, a communications module 1203, and a display module 1204, The display module 1204 is configured to support the first terminal 1200 in displaying specific information. For example, the display module 1203 is configured to support the first terminal 1200 in performing the procedure 401 in FIG. 4. The processing module 1202 is configured to perform control management on an action of the first terminal 1200. For example, the processing module 1202 is configured to support the first terminal 1200 in performing the procedures 402 and 403 in FIG. 4, the procedures 901, 902, 903, 904, 905, 906, and 907 in FIG. 10*a*, FIG. 10*b*, and FIG. 10*c*1, the procedures 1001, 1002, 1003, and 1004 in FIG. 11*a*, FIG. 11*b*, and FIG. 11*c*, and/or other procedures of the technology described in this specification. The communications module 1203 is configured to support the first terminal 1200 in communicating with another network entity, for example, communicating with a second terminal or a server of a target third-party payment application. The first terminal 1200 may further include a storage module 1201, configured to store program code and data of the first terminal.

The processing module 1202 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1202 may implement or execute various example logical blocks, modules, and circuits that are described with reference to the content disclosed in this application. The processor may alternatively be a combination implementing computing functions, for example, a combination including one or more microprocessors or a combination of a DSP and a microprocessor. The communications module 1203 may be a transceiver, a transceiver circuit, a communications interface, or the like. The display module 1204 may be any type of display, or the like. The storage module 1201 may be a memory.

Figure 12C:
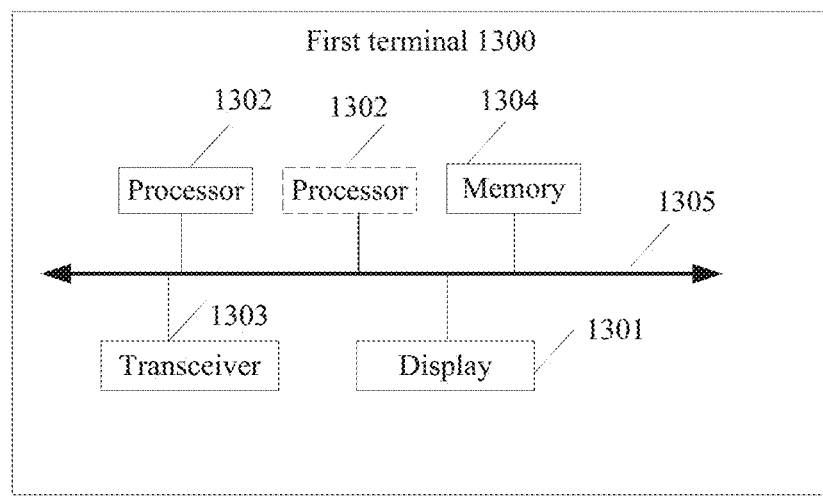

When the processing module 1202 is a processor, the communications module 1203 is a transceiver, the display module 1204 is a display, and the storage module 1201 is a memory, the first terminal in this embodiment of this application may be a first terminal shown in FIG. 12*c*.

Referring to FIG. 12*c*, the first terminal 1300 includes a display 1301, one or more processors 1302, a transceiver 1303, a memory 1304, and a bus 1305. The transceiver 1303, the processor 1302, and the memory 1304 are connected to each other by using the bus 1305. The bus 1305 may be a Peripheral Component Interconnect (Peripheral Component Interconnect, PCI) bus, an Extended Industry Standard Architecture (Extended Industry Standard Architecture, EISA) bus, or the like. The bus may be classified into an address bus, a data bus, a control bus, or the like. For ease of representation, the bus is represented by using only one bold line in FIG. 12*c*. However, it does not indicate that there is only one bus or only one type of bus.

Figure 12D:
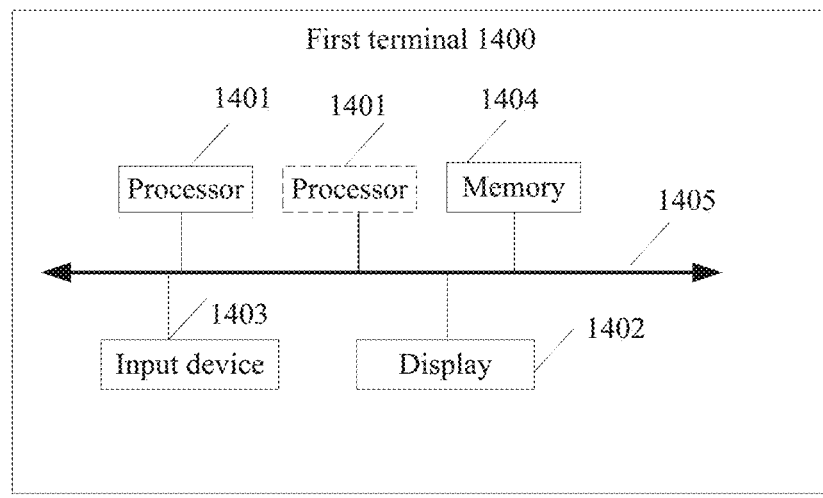

Specifically, referring to FIG. 12d, a first terminal 1400 includes one or more processors 1401, a display 1402, an input device 1403, and a memory 1404 that are connected to each other by using a bus 1405. The memory 1404 stores one or more programs, the one or more programs include an instruction, and when the instruction is executed by the first terminal, the first terminal is enabled to perform the following steps: the display 1402 displays a first screen, where the first screen displays at least one third-party payment application; the input device 1403 receives a selection operation of a user for selecting a target third-party payment application on the first screen; and in response to the selection operation, the processor 1401 interacts with a second terminal by using the target third-party payment application, to complete NFC payment.

Optionally, the input device 1403 is further configured to: when the first terminal is in a screen locked state, receive a quick operation entered by the user, where the quick operation includes pressing a preset physical button, entering preset fingerprint information, entering a specific voice instruction, or entering a preset gesture; and the display 1402 is further configured to display the first screen in response to the quick operation.

Optionally, the display 1402 is further configured to display the first screen when the first terminal comes into contact with the second terminal.

Optionally, the display 1402 is further configured to display a second screen in response to the selection operation, where the second screen displays first prompt information, and the first prompt information is used to prompt the user to perform identity authentication; and the processor 1401 is further configured to: in response to an operation of successful user identity authentication, interact with the second terminal to complete NFC payment.

Optionally, the display 1402 is further configured to display second prompt information, where the second prompt information is used to inform the user that the NFC payment has been completed.

Figure 13A:
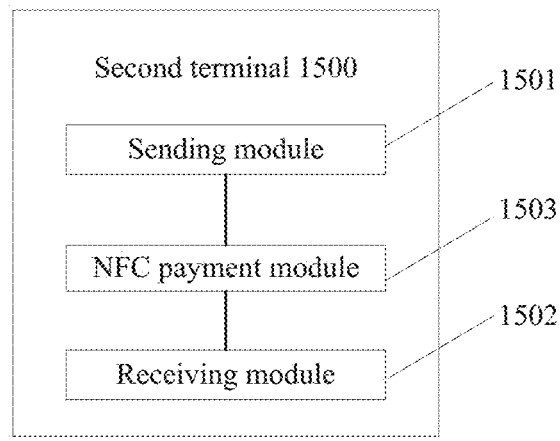
FIG. 13a, FIG. 13b, and FIG. 13c are schematic structural diagrams of second terminals according to an embodiment of this application.

When each functional module is obtained through division in correspondence to functions, FIG. 13a is a possible schematic structural diagram of a second terminal according to an embodiment. A second terminal 1500 includes a sending module 1501, a receiving module 1502, and an NFC payment module 1503. The sending module 1501 is configured to support the second terminal 1500 in performing the procedures 902, 905, and 910a in FIG. 10a, FIG. 10b, and FIG. 10c1; further configured to support the second terminal 1500 in performing the procedure 909b in FIG. 10b; further configured to support the second terminal 1500 in performing the procedures 909c and 914 in FIG. 10c2; and further configured to support the second terminal 1500 in performing the procedures 1003 and 1008a in FIG. 11a, the procedure 1007b in FIG. 11b, and the procedures 1007c and 1011c in FIG. 11c, The receiving module 1502 is configured to support the second terminal 1500 in performing the procedures 904 and 907 in FIG. 10a; further configured to support the second terminal 1500 in performing the procedure 911c in FIG. 10c2; and further configured to support the second terminal 1500 in performing the procedure 1004 in FIG. 11a and the procedure 1008c in FIG. 11c. The NFC payment module 1503 is configured to support the second terminal 1500 in performing the procedures 908a and 909a in FIG. 10a; further configured to support the second terminal 1500 in performing the procedure 908b in FIG. 10b, and the procedures 908c, 912c, and 913 in FIG. 10c2; further configured to support the second terminal 1500 in performing the procedures 1005, 1006a, and 1007a in FIG. 11a; and further configured to support the second terminal 1500 in performing the procedure 1006b in FIG. 11b, and the procedures 1006c, 1009c, and 1010c in FIG. 11c.

All related content of various steps in the foregoing method embodiments may be cited in function descriptions of a corresponding functional module. Details are not described herein again.

Figure 13B:
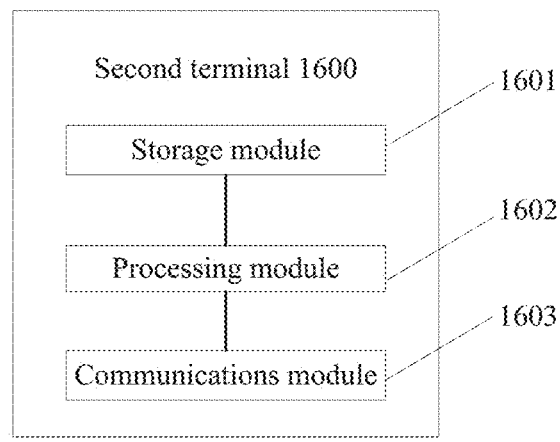

When an integrated unit is used, FIG. 13b is a possible schematic structural diagram of a second terminal according to an embodiment. A second terminal 1600 includes a processing module 1602 and a communications module 1603. The processing module 1602 is configured to perform control management on an action of the second terminal 1600. For example, the processing module 1602 is configured to support the second terminal 1600 in performing the procedures 908a and 909a in FIG. 10a; the procedure 908b in FIG. 10b; the procedures 908c, 912c, and 913 in FIG. 10c2; the procedures 1005, 1006a, and 1007a in FIG. 11a; the procedure 1006b in FIG. 11b; the procedures 1006c, 1009c, and 1010c in FIG. 11c; and/or other procedures of the technology described in this specification. The communications module 1603 is configured to support the second terminal 1600 in communicating with another network entity, for example, communicating with a first terminal or a server of a target third-party payment application. The second terminal 1600 may further include a storage module 1601, configured to store program code and data of the second terminal.

The processing module 1602 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field. Programmable Gate Array, FPGA) or another programmable logic device, a transistor logic device, hardware component, or any combination thereof. The processing module 1602 may implement or execute various example logical blocks, modules, and circuits that are described with reference to the content disclosed in this application. The processor may alternatively be a combination implementing computing functions, for example, a combination including one or more microprocessors or a combination of a DSP and a Microprocessor. The communications module 1603 may be a transceiver, a transceiver circuit, a communications interface, or the like. The storage module 1601 may be a memory.

Figure 13C:
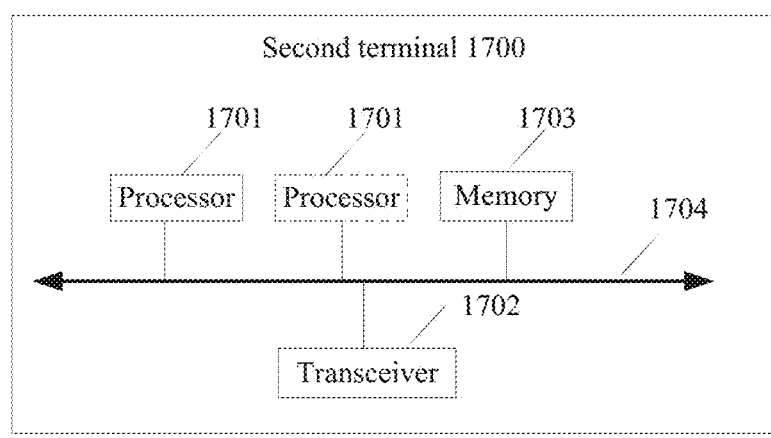

When the processing module 1602 is a processor, the communications module 1603 is a transceiver, and the storage module 1601 is a memory, the second terminal in this embodiment of this application may be a second terminal shown in FIG. 13c.

Referring to FIG. 13c, the second terminal 1700 includes a processor 1701, a transceiver 1702, a memory 1703, and a bus 1704. The transceiver 1702, the processor 1701, and the memory 1703 are connected to each other by using the bus 1704. The bus 1704 may be a Peripheral Component Interconnect (Peripheral Component Interconnect, PCI) bus, an Extended Industry Standard Architecture (Extended Industry Standard Architecture, EISA) bus, or the like. The bus may be classified into an address bus, a data bus, a control bus, or the like. For ease of representation, the bus is represented by using only one bold line in FIG. 13c. However, it does not indicate that there is only one bus or only one type of bus.

The methods or algorithm steps described with reference to the content disclosed in this application may be implemented by hardware, or may be implemented by a processor executing a software instruction. The software instruction may include a corresponding software module. The software module may be stored in a random access memory (Random Access Memory, RAM), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. A storage medium used as an example is coupled to a processor, so that the processor can read information from the storage medium, and can write information into the storage medium. Certainly, a storage medium may alternatively be a part of a processor. The processor and the storage medium may be located in an ASIC.

A person skilled in the art should be aware that in one or more of the foregoing examples, the functions described in this application may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

In the foregoing specific implementations, the objective, technical solutions, and beneficial benefits of this application are further described in detail. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A method, comprising:
in response to a first terminal detecting a radio frequency field of a second terminal, automatically displaying, by the first terminal, a third-party payment application;
receiving, by the first terminal through a Near Field Communication (NFC) connection established between the first terminal and the second terminal, an application selection instruction sent by the second terminal, wherein the application selection instruction carries an application identification (AID) of the third-party payment application;
determining, by the first terminal, based on representation information declared by the third-party payment application to the first terminal, a first service corresponding to the AID in the application selection instruction;
receiving, by the first terminal through the NFC connection established between the first terminal and the second terminal, a request message sent by the second terminal, wherein the request message is used to obtain payment information of the third-party payment application; and
sending, by the first terminal, a preset-format response message to the second terminal based on the request message through the NFC connection, wherein the preset-format response message carries the payment information of the third-party payment application, and wherein the sending, by the first terminal, a preset-format response message to the second terminal based on the request message through the NFC connection comprises: parsing, by the first terminal, the request message based on the first service corresponding to the AID in the application selection instruction.

2. The method according to claim 1, wherein before the sending, by the first terminal, a preset-format response message to the second terminal, the method further comprises:
determining, by the first terminal, that user identity authentication succeeds.

3. The method according to claim 1, wherein after the sending, by the first terminal, a preset-format response message to the second terminal, the method further comprises:
outputting, by the first terminal, an indication that NFC payment has been completed.

4. The method according to claim 1, wherein the sending, by the first terminal, a preset-format response message to the second terminal based on the request message through the NFC connection comprises:
encapsulating the payment information of the third-party payment application into the preset-format response message; and
sending, by the first terminal, the preset-format response message to the second terminal through the NFC connection.

5. The method according to claim 1, wherein the receiving, by the first terminal through an NFC connection established between the first terminal and the second terminal, a request message sent by the second terminal comprises:
receiving, by the first terminal through the NFC connection established between the first terminal and the second terminal, a request message for NFC tag reading sent by the second terminal; and
wherein the sending, by the first terminal, a preset-format response message to the second terminal based on the request message through the NFC connection comprises:
obtaining, by the first terminal, the preset-format response message that is stored in a pre-generated NFC tag, and sending the preset-format response message to the second terminal through the NFC connection.

6. The method according to claim 5, wherein the method further comprises:
generating, by the first terminal, the preset-format response message by using the payment information of the third-party payment application; and
encapsulating the preset-format response message into the NFC tag.

7. An electronic device, comprising:
a display screen;
a non-transitory memory comprising instructions; and
a processor coupled to the non-transitory memory, the instructions being executed by the processor to cause the electronic device to:
in response to the electronic device detecting a radio frequency field of another electronic device, automatically display a third-party payment application;
receive, through a Near Field Communication (NFC) connection established between the electronic device and the another electronic device, an application selection instruction sent by the another electronic device, wherein the application selection instruction carries an application identification (AID) of the third-party payment application;

determine, based on representation information declared by the third-party payment application to the electronic device, a first service corresponding to the AID in the application selection instruction;

receive a request message sent by the another electronic device, through the NFC connection established between the electronic device and the another electronic device, wherein the request message is used to obtain payment information of the third-party payment application;

parse the request message based on the first service corresponding to the AID in the application selection instruction; and send a preset-format response message to the another electronic device based on the request message through the NFC connection, wherein the preset-format response message carries the payment information of the third-party payment application.

8. The electronic device according to claim 7, the instructions further cause the electronic device to:

encapsulate the payment information of the third-party payment application into the preset-format response message; and send the preset-format response message to the another electronic device through the NFC connection.

9. The electronic device according to claim 7, the instructions further cause the electronic device to:

receive a request message for NFC tag reading sent by the another electronic device, through the NFC connection; and obtain the preset-format response message that is stored in a pre-generated NFC tag; and send the preset-format response message to the another electronic device through the NFC connection.

10. The electronic device according to claim 9, the instructions further cause the electronic device to:

generate the preset-format response message by using the payment information of the third-party payment application; and encapsulate the preset-format response message into the NFC tag.

11. A non-transitory computer-readable medium storing computer instructions, that when executed by one or more processors, cause an electronic device to perform operations comprising:

in response to detecting a radio frequency field of a second terminal, automatically displaying a third-party payment application;

receiving, through a Near Field Communication (NFC) connection established between the electronic device and the second terminal, an application selection instruction sent by the second terminal, wherein the application selection instruction carries an application identification (AID) of the third-party payment application;

determining, based on representation information declared by the third-party payment application to the electronic device, a first service corresponding to the AID in the application selection instruction;

receiving, through the NFC connection established between the electronic device and the second terminal, a request message sent by the second terminal, wherein the request message is used to obtain payment information of the third-party payment application;

and sending a preset-format response message to the second terminal based on the request message through the NFC connection, wherein the preset-format response message carries the payment information of the third-party payment application, and wherein the sending a preset-format response message to the second terminal based on the request message through the NFC connection comprises: parsing the request message based on the first service corresponding to the AID in the application selection instruction.

* * * * *